US010791171B2

(12) United States Patent
Li et al.

(10) Patent No.: US 10,791,171 B2
(45) Date of Patent: Sep. 29, 2020

(54) CONTEXT-AWARE PROXIMITY SERVICES

(71) Applicant: Convida Wireless, LLC, Wilmington, DE (US)

(72) Inventors: Qing Li, Princeton Junction, NJ (US); Paul L. Russell, Jr., Pennington, NJ (US); Chonggang Wang, Princeton, NJ (US); Hongkun Li, Malvern, PA (US); Zongrui Ding, Portland, OR (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 14/328,276

(22) Filed: Jul. 10, 2014

(65) Prior Publication Data

US 2015/0019717 A1 Jan. 15, 2015

Related U.S. Application Data

(60) Provisional application No. 61/844,689, filed on Jul. 10, 2013.

(51) Int. Cl.
*H04L 29/08* (2006.01)
*H04W 8/00* (2009.01)
(Continued)

(52) U.S. Cl.
CPC ......... *H04L 67/1085* (2013.01); *H04L 67/16* (2013.01); *H04L 69/321* (2013.01);
(Continued)

(58) Field of Classification Search
CPC ............... H04L 29/08; H04L 29/08009; H04L 67/1085; H04W 8/00; H04W 8/005
(Continued)

(56) References Cited

U.S. PATENT DOCUMENTS 6,493,331 B1 12/2002 Walton et al.
7,352,770 B1 4/2008 Yonge et al.
(Continued)

FOREIGN PATENT DOCUMENTS

CN 1989703 A 6/2007
CN 101795500 A 8/2010
(Continued)

OTHER PUBLICATIONS

3rd Generation Partnership Project (3GPP); S1-120059, "Suggested D2D Terminologies (Operator Managed, Operator Assisted, Operator Free)", 3GPP TSG-SA WG1 Meeting #57, Kyoto, Japan, Feb. 13-17, 2012, 3 pages.
(Continued)

*Primary Examiner* — Meng Vang
(74) *Attorney, Agent, or Firm* — BakerHostetler

(57) ABSTRACT

Disclosed herein are a variety of systems, operations, MAC primitives, and procedures for context-aware Peer-to-Peer communications and multi-application Peer-to-Peer communications. An example system for a context-aware Peer-to-Peer communications system may include a physical and Medium Access Control (PHY/MAC) layer and an upper layer above the PHY/MAC layer. The PHY/MAC layer may include at least one of a discovery function, an association function, a data transceiving function, a channel management function, a general scan function, a synchronization function, a power control function, or management and reporting function. The upper layer may be one of a service layer or an application layer.

18 Claims, 13 Drawing Sheets

(51) Int. Cl.
    *H04W 8/24* (2009.01)
    *H04W 4/70* (2018.01)
(52) U.S. Cl.
    CPC ........... *H04L 69/324* (2013.01); *H04W 8/005* (2013.01); *H04W 4/70* (2018.02); *H04W 8/24* (2013.01)
(58) Field of Classification Search
    USPC ........................................................ 709/224
    See application file for complete search history.

(56) References Cited

U.S. PATENT DOCUMENTS

| | | | |
|---|---|---|---|
| 7,469,297 B1 | 12/2008 | Kostoff et al. | |
| 7,660,860 B2 | 2/2010 | Yoon et al. | |
| 7,730,208 B2 | 6/2010 | Saha et al. | |
| 7,756,082 B1* | 7/2010 | Dhamdhere | H04W 36/0085 |
| | | | 370/331 |
| 7,787,397 B2 | 8/2010 | Olvera-Hernandez | |
| 8,041,380 B2 | 10/2011 | Hamdi et al. | |
| 8,175,627 B2 | 5/2012 | Shon et al. | |
| 8,285,319 B2 | 10/2012 | Shin et al. | |
| 8,315,564 B2 | 11/2012 | Banerjea | |
| 8,363,586 B2 | 1/2013 | Rosario | |
| 8,738,093 B1 | 5/2014 | Gopalakrishnan et al. | |
| 8,880,009 B2 | 11/2014 | Baldessari et al. | |
| 8,892,032 B2 | 11/2014 | Madhukar et al. | |
| 8,958,838 B2 | 2/2015 | Patel et al. | |
| 9,098,177 B2 | 8/2015 | Das | |
| 9,210,085 B2 | 12/2015 | Harrison | |
| 9,232,393 B2 | 1/2016 | Van et al. | |
| 2002/0132586 A1 | 9/2002 | Chen et al. | |
| 2002/0159395 A1 | 10/2002 | Nelson et al. | |
| 2003/0212822 A1 | 11/2003 | Saha et al. | |
| 2003/0212827 A1 | 11/2003 | Saha et al. | |
| 2005/0068916 A1 | 3/2005 | Jacobsen et al. | |
| 2005/0193106 A1 | 9/2005 | Desai et al. | |
| 2006/0009159 A1 | 1/2006 | Leung | |
| 2006/0013256 A1 | 1/2006 | Lee et al. | |
| 2006/0166690 A1 | 7/2006 | Nishio et al. | |
| 2006/0248525 A1* | 11/2006 | Hopkins | G06F 21/552 |
| | | | 717/177 |
| 2006/0253736 A1 | 11/2006 | Rudolf et al. | |
| 2007/0005775 A1* | 1/2007 | Philips | G06Q 10/10 |
| | | | 709/227 |
| 2007/0104116 A1 | 5/2007 | Olvera-Hernandez | |
| 2007/0115829 A1 | 5/2007 | Strutt et al. | |
| 2007/0253352 A1 | 11/2007 | Arisha et al. | |
| 2008/0055068 A1 | 3/2008 | Van et al. | |
| 2008/0068217 A1 | 3/2008 | Van et al. | |
| 2008/0134271 A1 | 6/2008 | Qin et al. | |
| 2008/0170541 A1 | 7/2008 | Vartiainen et al. | |
| 2008/0268892 A1 | 10/2008 | Hamdi et al. | |
| 2009/0029650 A1 | 1/2009 | Shon et al. | |
| 2009/0104875 A1 | 4/2009 | Naniyat | |
| 2009/0204354 A1* | 8/2009 | Davis | H04W 84/18 |
| | | | 702/89 |
| 2009/0213774 A1 | 8/2009 | Chapman et al. | |
| 2009/0311961 A1 | 12/2009 | Banerjea | |
| 2009/0325484 A1 | 12/2009 | LeLe | |
| 2010/0103870 A1 | 4/2010 | Garcia-Luna-Aceves et al. | |
| 2010/0110999 A1 | 5/2010 | Li et al. | |
| 2010/0150027 A1 | 6/2010 | Atwal et al. | |
| 2010/0153562 A1 | 6/2010 | Burr | |
| 2010/0165961 A1 | 7/2010 | Rosario | |
| 2010/0198459 A1 | 8/2010 | Kosai et al. | |
| 2010/0232333 A1 | 9/2010 | Higuchi et al. | |
| 2010/0233963 A1 | 9/2010 | Harada et al. | |
| 2010/0235925 A1 | 9/2010 | Lee | |
| 2010/0248727 A1* | 9/2010 | Karaoguz | H04L 45/00 |
| | | | 455/442 |
| 2010/0323717 A1 | 12/2010 | Agashe et al. | |
| 2011/0082939 A1* | 4/2011 | Montemurro | H04W 76/023 |
| | | | 709/227 |
| 2011/0117852 A1 | 5/2011 | Copeland et al. | |
| 2011/0173331 A1* | 7/2011 | Setton | H04M 3/42263 |
| | | | 709/227 |
| 2011/0182280 A1 | 7/2011 | Charbit | |
| 2011/0201275 A1* | 8/2011 | Jabara | H04L 12/5692 |
| | | | 455/41.2 |
| 2011/0225368 A1 | 9/2011 | Burge, III | |
| 2012/0135778 A1 | 5/2012 | Tian | |
| 2012/0142392 A1 | 6/2012 | Patel et al. | |
| 2012/0155349 A1 | 6/2012 | Bajioc | |
| 2012/0184321 A1 | 7/2012 | Baldessari et al. | |
| 2012/0201158 A1 | 8/2012 | Geirhofer et al. | |
| 2012/0224484 A1* | 9/2012 | Babiarz | H04L 41/5019 |
| | | | 370/235 |
| 2012/0258741 A1 | 10/2012 | Tillson et al. | |
| 2012/0296995 A1* | 11/2012 | Yan | G06Q 50/01 |
| | | | 709/206 |
| 2012/0314600 A1 | 12/2012 | Zeira | |
| 2013/0034064 A1 | 2/2013 | Nam et al. | |
| 2013/0044681 A1 | 2/2013 | Abraham et al. | |
| 2013/0058288 A1 | 3/2013 | Nentwig | |
| 2013/0077661 A1 | 3/2013 | Jacobsen et al. | |
| 2013/0148517 A1 | 6/2013 | Abraham et al. | |
| 2013/0250931 A1 | 9/2013 | Abraham et al. | |
| 2013/0288601 A1* | 10/2013 | Chhabra | H04W 4/001 |
| | | | 455/41.2 |
| 2013/0297810 A1* | 11/2013 | Ho | H04W 76/14 |
| | | | 709/228 |
| 2013/0317892 A1* | 11/2013 | Heerboth | G06Q 30/0241 |
| | | | 705/14.4 |
| 2014/0105186 A1 | 4/2014 | Park et al. | |
| 2014/0108868 A1 | 4/2014 | Neerincx et al. | |
| 2014/0126655 A1 | 5/2014 | Vijayasankar et al. | |
| 2014/0153500 A1 | 6/2014 | Duan et al. | |
| 2014/0173447 A1 | 6/2014 | Das | |
| 2014/0359148 A1 | 12/2014 | Cherian et al. | |
| 2014/0372774 A1 | 12/2014 | Li et al. | |
| 2014/0372775 A1 | 12/2014 | Li et al. | |
| 2015/0133083 A1 | 5/2015 | Van et al. | |
| 2015/0223111 A1 | 8/2015 | Lindoff et al. | |
| 2016/0295521 A1 | 10/2016 | Grayson et al. | |

FOREIGN PATENT DOCUMENTS

| | | | |
|---|---|---|---|
| CN | 102165840 A | 8/2011 | |
| CN | 102695131 A | 9/2012 | |
| CN | 102893589 A | 1/2013 | |
| CN | 103037489 A | 4/2013 | |
| EP | 2012442 B1 | 5/2012 | |
| EP | 2701457 A1 * | 2/2014 | ........ H04W 76/023 |
| FR | 2 910 764 | 6/2008 | |
| JP | 2001-308786 A | 11/2001 | |
| JP | 2005-057602 A | 3/2005 | |
| JP | 2006-050510 A | 2/2006 | |
| JP | 2006-054707 A | 2/2006 | |
| JP | 2006-148914 A | 6/2006 | |
| JP | 2007-150745 A | 6/2007 | |
| JP | 2008-077421 A | 4/2008 | |
| JP | 2008-538465 A | 10/2008 | |
| JP | 2009-038659 A | 2/2009 | |
| JP | 2009-536002 A | 10/2009 | |
| JP | 2010-130096 A | 6/2010 | |
| JP | 2010-165351 A | 7/2010 | |
| JP | 2010-183178 A | 8/2010 | |
| JP | 2011-014022 A | 1/2011 | |
| JP | 2011-239210 A | 11/2011 | |
| JP | 2012-147146 A | 8/2012 | |
| JP | 2013-017229 A | 1/2013 | |
| JP | 2014-527750 A | 10/2014 | |
| KR | 10-2010-0080406 A | 7/2010 | |
| KR | 10-2011-0093870 A | 8/2011 | |
| WO | 2006/110492 A2 | 10/2006 | |
| WO | 2007/130883 A2 | 11/2007 | |
| WO | 2011/153269 A1 | 12/2011 | |
| WO | WO 2012-144707 A1 | 10/2012 | |
| WO | 2013/022244 A2 | 2/2013 | |
| WO | 2013/169974 A1 | 11/2013 | |
| WO | 2014/186261 | 11/2014 | |

(56) References Cited

FOREIGN PATENT DOCUMENTS

| WO | 2014/205370 A1 | 12/2014 |
|---|---|---|
| WO | WO 2014-201240 | 12/2014 |
| WO | WO 2014-201251 | 12/2014 |
| WO | WO 2015-006585 | 1/2015 |

OTHER PUBLICATIONS

3rd Generation Partnership Project (3GPP); TR 22.803 V0.2 .0; 3rd Generation Partnership Project; Technical Specification Group SA; Feasibility Study for Proximity Services (ProSe), (Release 12), Feb. 2012, 18 pages.
Ersue et al, "Management of Networks with Constrained Devices: Use Cases draft-ietf-opsawg-coman-use-cases-01", The Internet Engineering Task Force(IETF), Feb. 14, 2014, 30 pages.
Heile et al, "Wireless Medium Access Control (MAC) and Physical Layer (PHY) Specifications for Peer Aware Communications(PAC)", IEEE P802.15.8, Feb. 8, 2012, 2 pages.
IEEE Standard for Local and Metropolitan Area Networks—Part 15.4: Low-Rate Wireless Personal Area Networks (LR-WPANs), IEEE Std 802.15.4-2011, Sep. 5, 2011, 314 pages.
International Application No. PCT/US2014/046193: International Search Report and Written Opinion dated Nov. 28, 2014, 8 pages.
International Application No. PCT/US2014/043449: International Search Report and Written Opinion dated Nov. 24, 2014, 8 pages.
International Application No. PCT/US2014/042107: International Search Report dated Oct. 28, 2014, 6 pages.
International Application No. PCT/US2014/042128: International Search Report dated Oct. 28, 2014, 6 pages.
Lee, M., "PAC Introduction", IEEE 802.15-12-0004-01-0pac, Jan. 18, 2012, 20 pages.
Lee, M., "Peer Aware Communications (PAC) Study Group 5 Criteria", IEEE P802.15-12-0064-01, Jan. 20, 2012, 4 pages.
Liu et al, "Consideration on MAC enhancement of IEEE 802.15. 4-2006", Jul. 6, 2007, 9 pages.
Liu et al, "MAC Proposals for Low Energy Critical Infrastructure Networks", IEEE 802.15.4k, Jul. 18, 2011, 13 pages.
Meyer,D. and Feamster, N., "Proto-SDNRG Meeting", IETF, 84, Apr. 2012.
Shelby et al, "Constrained Application Protocol (CoAP) draft-shelby-core-coap-01", The Internet Engineering Task Force (IETF), May 10, 2010, 33 pages.
Korean Application No. 10-2016-7003147: Office Action dated Jan. 18, 2017, 6 pages.
Japanese Application No. 2016-525488: Notice of Reasons for Rejection dated Jan. 25, 2017, 3 pages.
Yedavalli, K. and Krishnamachari, B., "Enhancement of the IEEE 802.15.4 MAC Protocol for Scalable Data Collection in Dense Sensor Networks", 2006, 10 pages.
Park, Seung-Hoon, "TG8 Technical Guidance Document", IEEE, P802.15 Wireless Personal Area Networks, Mar. 19, 2013, https://mentor.ieee.org/802.15/dcn/12/15-120568-05-0008-tg8-technical-guidance-document.docx.
Kwak et al, "Proposed Text on Transmit Power Control for TGD", IEEE 15-13-0020-00-0008, P802.15, Jan. 11, 2013, https://mentor.ieee.org/802.15/dcn/13/15-"13-0020-00-0008-proposed-text-on-transmit-Qower-control-for-tgd.pptx.
IEEE 802.154k, IEEE Standard for Local and metropolitan area networks—"Part 15.4: Low-Rate Wireless Personal Area Networks (LR-WPANs) Amendment 5: Physical Layer Specifications for Low Energy, Critical Infrastructure Monitoring Networks", Jun. 14, 2013, 149 pages.
Ho, Some Proposed Changes to IEEE P802.15.6/D01 MAC and Security Subclasses, IEEE 802.15-10/0678r0, IEEE, Oct. 2010, pp. 19-28, searched date Aug. 9, 2018.
English Translation of JP Office Action dated Sep 11, 2018 for JP Application No. 2017233480.
English Translation of JP Office Action dated Aug 15, 2018 for JP Application No. 2017224729.

* cited by examiner

CONTEXT-AWARE PROXIMITY SERVICES

CROSS REFERENCE TO RELATED APPLICATIONS

This application claims the benefit of U.S. Provisional Patent Application Ser. No. 61/844,689, filed Jul. 10, 2013, the disclosure of which is hereby incorporated by reference as if set forth in its entirety herein.

BACKGROUND

Peer-to-peer (P2P) proximity communication may refer to infrastructure-based or infrastructure-less communications between peers within a proximity of each other. A peer may refer to a user or a device such as, for example, a mobile station (MS) in a 2G system, or a full-function device (FFD) or reduced-function device (RFD) in a IEEE 802.15 wireless personal area network (WPAN). Examples of P2P devices include connected cars, medical devices, smart meters, smart phones, tablets, laptops, game consoles, set-top boxes, cameras, printers, sensors, home gateways, and the like. P2P proximity communication may focus on a peer being aware of its proximity for desired services in an infrastructure-based or infrastructure-less configuration. For example, P2P communications may be implemented in a centralized system that includes a centralized controller or a fully distributed system without a central controller. In contrast to infrastructure-less P2P communications, infrastructure-based communications often include a centralized controller, for example, for handling user information, scheduling among users, and managing connections (e.g., cellular communications). In infrastructure-less P2P communications, peers typically have equal responsibility for initiating, maintaining, and terminating a communication session. Proximity-based applications and services represent a recent socio-technological trend. P2P proximity communications are used in various implementations including, for example, social networking, advertising, emergency situations, gaming, smart transportation, and network to network scenarios.

In typical social network implementations, peers in proximity can interact with each other at the application level (e.g., Facebook, Twitter). Two-way communication among two or more peers is often required in social network implementations of P2P proximity communications. Traffic data rates may be low (e.g., text-based chatting) or high (e.g., content sharing). In an example advertising implementation of P2P proximity communications, a store broadcasts its promotions and coupons to potential customers (peers) who are within a proximity to the store's location. In this example scenario, one-way communication with low data traffic is typical, but two-way communication may be used (e.g., for personalized advertisements).

Implementation of P2P proximity communications in emergency situations usually involves one-way communication, such as an emergency alarm for example. Other emergency implementations need two-way communication, such as during an emergency safety management scenario. An emergency service/application of P2P may have higher priority than other P2P services/applications, and some emergency services/applications may have higher privacy requirements. In an example gaming implementation of P2P, multiple peers initialize or participate in interactive games, such as multiplayer gaming (online or otherwise) following certain rules for example. Interactive P2P gaming often requires low latency. In an example smart transportation implementation of P2P proximity communication, connected cars via car-to-car and/or car-to-infrastructure communication can support advanced applications including, for example, congestion/accident/event notification, interactive transportation management such as carpooling and train scheduling, smart traffic control, and the like. Data rates in smart transportation implementations are often low, but smart transportation may require highly reliable message delivery and very low latency. Network to Network P2P may be used for extending the coverage of infrastructure or offloading from infrastructure.

The example implementations of P2P communications described above may relate to machine-to-machine (M2M) and Internet of Things (IoT) applications or services. The IoT introduces objects or things to Human-to-Human (H2H) based Internet services. It marks a stage of the Internet where physical or virtual objects are interconnected to enable the Internet of Services (IoS). Many of these services are proximity based, such as smart shopping, smart home, smart office, smart health, smart transportation, smart parking, smart grid, and smart city, among other things.

Proximity services may be based on peer-to-peer (P2P) communications in proximity. P2P devices include tablets, smart phones, music players, game consoles, personal digital assistances, laptops/PCs, medical devices, connected cars, smart meters, sensors, gateways, monitors, alarms, set-top boxes, printers, Google glasses, drones, and service robots, among other things. A P2P communication system may be a central system with a controller or core network serving as an infrastructure, or a distributed system without a controller or core network serving as the infrastructure. Proximity services may include human-to-human (H2H) proximity services, machine-to-machine (M2M) proximity services, machine-to-human (M2H) proximity services, human-to-machine (H2M) proximity services, and network of network proximity services.

Proximity-based applications and services represent a trend to offload heavy local internet traffic from a core infrastructure as well as provide the connections to an infrastructure via multi-hopping. Many standards have identified proximity services use cases as part of their standardization working groups, such as 3GPP, oneM2M, IETF, IEEE, and OMA for example.

Existing wireless systems that provide at least some support to P2P communication include, for example, Bluetooth, Wi-Fi ad hoc mode, and Wi-Fi direct. Bluetooth refers to a wireless technology standard for exchanging data over short distances from fixed and/or mobile devices by creating personal area networks (PANs). This technology is often useful when transferring information between two or more devices that are within a proximity to each other, wherein the information is transferred at a low data rate. Bluetooth is a packet-based protocol with a master-slave structure. One master may communicate with up to 7 slaves in a piconet. The master chooses which slave device to address, typically in a round-robin fashion. A slave may listen in each receive slot. Being a master of seven slaves is possible. Being a slave of more than one master may be difficult, for example, because slave devices may have one connection at a time, while master devices may have multiple connections with different slave devices simultaneously.

Wi-Fi ad hoc mode is also known as Independent Basic Service Set (IBSS). Wi-Fi ad hoc mode consists of local wireless devices (nodes) discovering each other and forming a network, wherein each node can forward data for other nodes. In ad hoc mode, wireless client machines connect to one another in order to form a peer-to-peer network in which the machines may act as both a client and an access point at the same time. Unlike Wi-Fi infrastructure mode, ad hoc mode has no distribution system that can send data frames from one station to another. Thus, an IBSS may be defined as a restricted wireless network.

Wi-Fi direct devices are able to communicate with each other without requiring a wireless access point. The Wi-Fi direct devices may negotiate when they first connect to each other to determine which device acts as an access point. Wi-Fi direct essentially embeds a software access point ("Soft AP") into any device that supports direct Wi-Fi. The soft AP provides a version of Wi-Fi protected setup with its push-button or PIN-based setup. Devices can make a one-to-one connection, or a group of several devices can connect simultaneously.

Current wireless systems, such as Bluetooth, Wi-Fi ad hoc, Wi-Fi direct for example, may provide direct device-to-device connections in short radio range for basic P2P communications without awareness of services or applications at lower layers, such as the physical (PHY) layer or the medium access control (MAC) layer for example.

SUMMARY

Disclosed herein are a variety of systems, operations, MAC primitives, and methods for context-aware Peer-to-Peer (P2P) communications and multi-application Peer-to-Peer communications. Such communications may be performed at the physical (PHY) layer and/or the medium access control (MAC) layer, for example.

In one aspect, an example context-aware Peer-to-Peer communications system includes a physical and Medium Access Control (PHY/MAC) layer and an upper layer above the PHY/MAC layer. The PHY/MAC layer may include at least one of a discovery function, an association function, a data transceiving function, a channel management function, a general scan function, a synchronization function, a power control function, and/or measurement and report function. The upper layer may be one of a service layer or an application layer. The context management function can manage context information such that context information can be exchange between the upper layers and the PHY/MAC layer.

In another aspect, a system may comprise a plurality of peers in proximity with each other. An upper layer of a first peer of the plurality of peers may trigger a peer-to-peer (P2P) session with a second peer of the plurality of peers. The P2P session may use a first application. Further, the upper layer may download context information that is related to the first application such that the context information is available, via the context management function, to at least one of a discovery function of the first peer, an association function of the first peer, a data transceiving function of the first peer, a channel management function of the first peer, a general scan function of the first peer, a synchronization function of the first peer, a power control function of the first peer, or a measurement and report function. In yet another aspect, the P2P session may be a first P2P session, and the upper layer may trigger a second peer-to-peer (P2P) session with a third peer of the plurality of peers such that the first P2P session and the second P2P session overlap in time. The second P2P session may use a second application that is different than the first application. Further, the upper layer may download context information related to the second application such that the context information is available, via the context management function, to at least one of the discovery function of the first peer, the association function of the first peer, the data transceiving function of the first peer, the channel management function of the first peer, the general scan function of the first peer, the synchronization function of the first peer, the power control function of the first peer, or a measurement and report function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF EMBODIMENTS

Terminology

Figure 1:
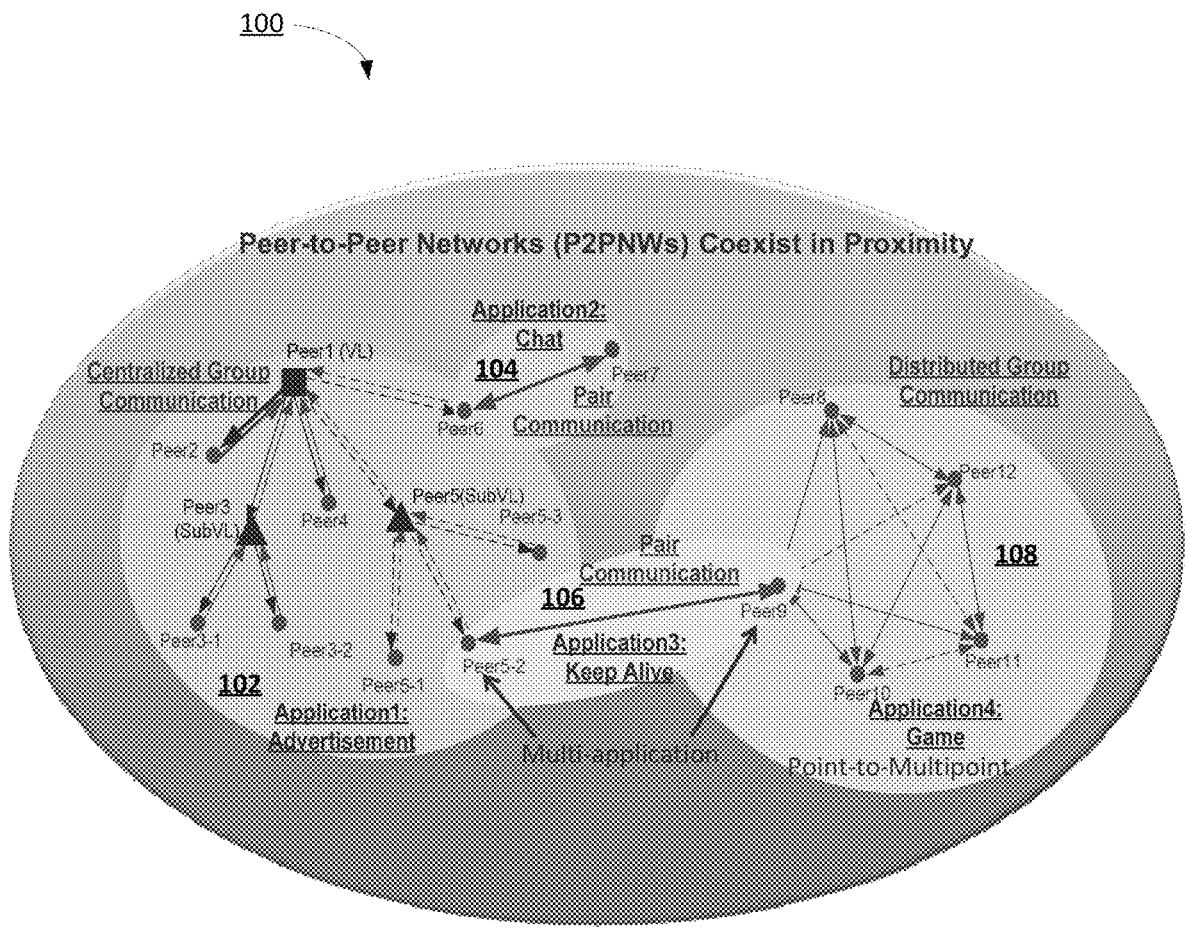
FIG. 1 is a system diagram of an example communication system in which multiple peer-to-peer (P2P) networks coexist in proximity with each other.

As used herein, the term "context" or the terms "context information" may generally refer to information that can be used to describe, track, and/or infer the situational state or condition of a service, an application, a device, a network, or a combination thereof. For example, context may refer to a service, an application, a location, a time, a power state, or the like. Examples of context information further include, presented by way of example and without limitation, location information, time information, an application category, a service power category, any user information, multi-hop information, mobility information, channel condition information, association information, device information, other application or service information, or the like.

A "peer", as used herein, may refer to a user, device, or machine, such as, for example, a mobile station (MS) in a 2G system, a full-function device (FFD) or reduced-function device (RFD) in a IEEE 802.15 wireless personal area network (WPAN), a station (STA) in an IEEE 802.11 wireless system, or the like. Examples of peers that can participate in peer-to-peer communications (P2P) include connected cars, medical devices, smart meters, smart phones, tablets, laptops, game consoles, set-top boxes, cameras, printers, sensors, home gateways, music players, personal digital assistances, monitors, alarms, set-top boxes, Google glasses, drones, and service robots, among other things. A peer can be a group of users, devices, gateways, or machines sharing a group identity (ID). Peer-to-Peer (P2P) communication may refer to infrastructure based (e.g., centralized) or infrastructure-less (e.g., distributed) communications among peers within proximity of each other.

As also used herein, the term "peer discovery" refers to a procedure used for a peer to find another peer(s) before peer association or attachment to enable P2P communication in proximity. This procedure is sometimes also referred to as neighbor discovery (ND).

"Peer association" refers to a procedure used for a peer to establish a logic connection with another peer(s) before peer data transmission for P2P communication. This procedure may also be referred to as peer attachment, pairing, peering, link establishment, and the like. The term "peer association update" refers to a procedure used for a peer to update an Association Identifier and/or Association Context of an existing association relationship with other peer(s). "Peer disassociation" refers to a procedure(s) used for a peer to cancel an existing association relationship with other peer(s). "Peer re-association" refers to procedure(s) used for a peer to re-associate a cancelled association relationship with other peer(s).

Proximity services may refer to any service that can be provided to a device that is within a proximity. Thus, proximity services may be based on P2P communications in proximity. Proximity services may include human-to-human (H2H) proximity services, machine-to-machine (M2M) proximity services, machine-to-human (M2H) proximity services, human-to-machine (H2M) proximity services, and network to network proximity services.

H2H proximity services may refer to P2P communications that are user-based. Examples of H2H proximity services include various social networking implementations (e.g., status updates), gaming, streaming, content exchanging, conference meeting, eHealth, car pooling, emergency alarming, police or public safety services, etc. M2M proximity services may refer to device or object-based P2P communications. Example implementations of M2M proximity services include smart home or office implementations (e.g., auto configuration, synchronization, update, etc.), sensor networks, smart grids, or the like. M2H proximity services may refer to device (object) to human P2P communications. Example implementations of M2H proximity services include commercial broadcasts, group-casts, unicasts (e.g., personalized advertising), health monitoring implementations, health assistance implementations, hazard warnings, security monitoring implementations, traffic updates (e.g., congestion updates, accident updates, etc.), or the like. H2M proximity services human to device (object) based P2P communications. Example implementations of H2M proximity services include event scheduling, ticket updates, service reservations, smart parking, smart shopping, or the like. Example implementations of network to network proximity services may include, for example, multi-hop to infrastructure, offloading from infrastructure, uploading to hot spot, or the like. It will be understood that, unless otherwise stated, P2P communications may refer to P2P communications among a pair of peers or P2P communications among a group of peers, without limitation.

P2P Systems

As described above, current wireless systems, such as Bluetooth, Wi-Fi ad hoc, and Wi-Fi direct for example, may provide direct device-to-device connections in short radio range for basic P2P communications without awareness of services or applications at lower layers, such as the physical (PHY) layer or the medium access control (MAC) layer for example. By way of example of a current system, Device A might discover Device B, C, and D in proximity, but Device A might not be able to identify, which services or applications that the detected devices (B, C, or D) would like to join without going through a protocol stack up and down between the PHY/MAC layer and the application layers. Furthermore, current P2P systems do not fully support multiple services or applications simultaneously.

FIG. 1 illustrates an example communication system 100 in which one or more peer-to-peer networks (P2PNWs) may coexist in proximity. In the example system 100, there are four P2PNWs 102, 104, 106, and 108, though it will be understood that any number of P2P networks may be implemented within a communication system as desired. Each P2PNW 102, 104, 106, 108 implements a respective P2P service or application, such as an advertisement application (e.g., Application 1, where Peer1 multi-casts or broadcasts commercial advertisements directly to Peer 2, Peer3, Peer4, Peer5 and Peer6 in its radio range and where Peer3 and Peer5 multi-hop the commercial advertisement to Peer3-1, Peer3-2, Peer5-1, Peer5-2 and Peer5-3, respectively), a chat application (e.g., Application 2 between Peer6 and Peer7 while Peer6 also participates in Application 1 (Advertisement)), a keep alive application (e.g., Application 3 between Peer5-3 and Peer 9 while Peer5-3 also participates in Application 1 (Advertisement) and Peer9 in Application 4 (game)), or a game application (e.g., Application 4, where Peer8, Peer9, Peer10, Peer11 and Peer12 communicate to each other via unicast, multi-cast, or broadcast during the gaming session). A peer may be a tablet, smart phone, music player, game console, personal digital assistant, laptop, PC, medical device, connected car, smart meter, home gateway, monitor, alarm, sensor, set-top box, printer, a mobile station (MS) in a 2G network, a user equipment (UE) in a 3G network, or one or a group of full-function devices (FFDs) or reduced-function devices (RFDs) in IEEE 802.15 (wireless personal area network (WPAN)) networks. As one example, a peer may have the hardware architecture illustrated in FIG. 10C (described more fully below) or a variation thereof, or it may have the architecture of the computing system illustrated in FIG. 10D (also described more fully below).

In accordance with the illustrated example, the P2PNW 108 implements a distributed control scheme, wherein each peer of the P2PNW 108 manages control related communications with other peers of P2PNWs in proximity, by communicating with the other peers on a Common Control/Data Channel (CCDCH). The CCDCH may be used for, but not limited to, the following: common control messages among the P2PNWs in proximity, paging or broadcast messages to the P2PNWs in proximity, and short high priority data broadcasted to the P2PNWs in proximity. With distributed intra-P2PNW control, a peer manages its control related communications by communicating with other peers within a P2PNW, as shown by the solid or dotted, double-arrow lines. There is no VL acting as a central "controller", nor any SubVL either.

In accordance with the illustrated example, the P2PNW 102 implements a centralized control scheme. In an example centralized intra-P2PNW control scheme, a VL manages all control related communications directly or through SubVL(s) within a P2PNW, via communications with other peers within the P2PNW on a Dedicated Control/Data Channel (DCDCH). For example, Peer1 of the P2PNW 102 handles all control signals and/or messages among the peers (e.g., Peers 2, 4, 6) and SubVLs (e.g., Peers 3 and 5) within App1 in the P2PNW 102. Peer3 is a SubVL for Peers3-1 and 3-2.

Figure 2:
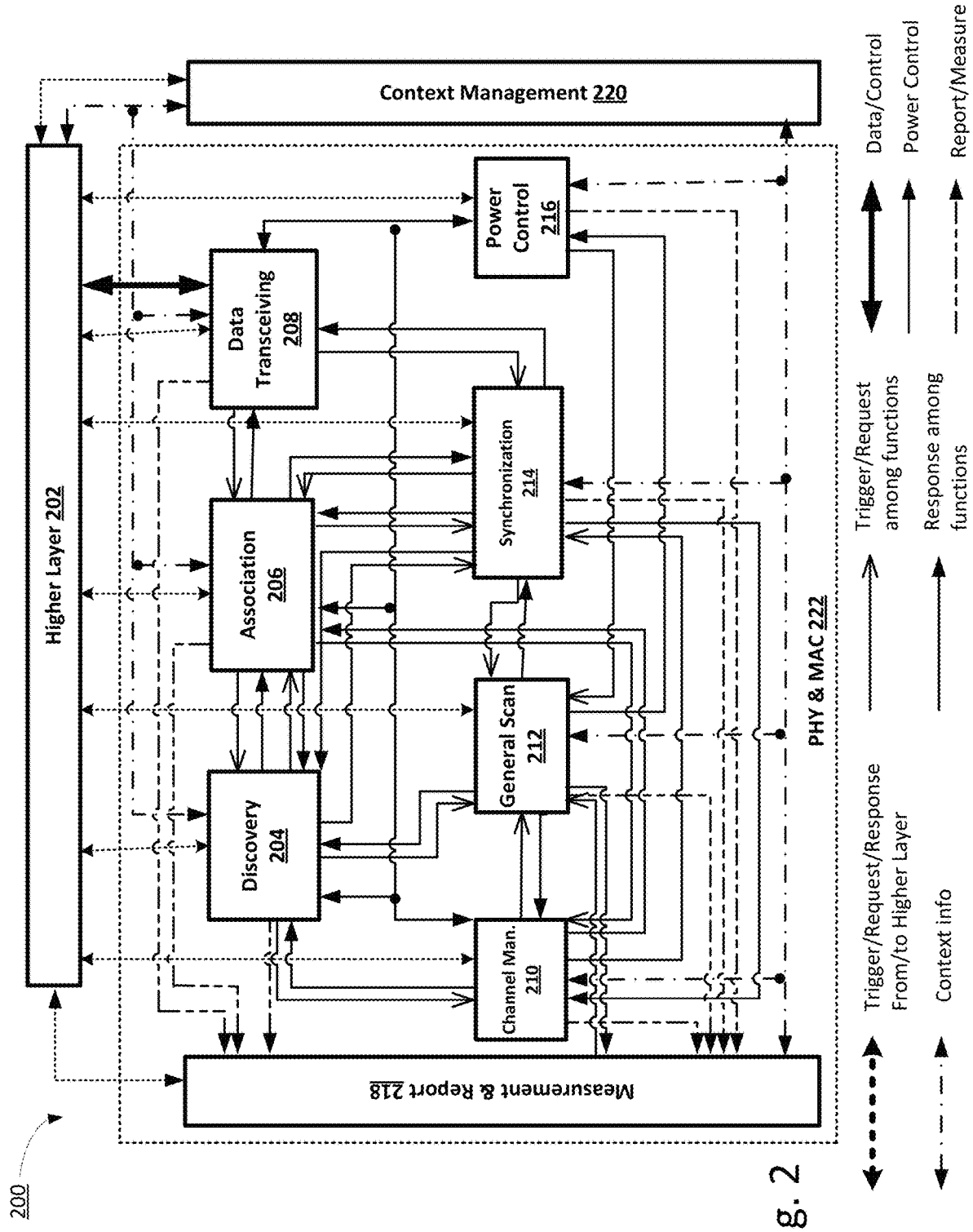
FIG. 2 depicts an exemplary system architecture for context-aware P2P communications.

Referring now to FIG. 2, an example system architecture 200 may be included in a communication system, such as the system 100 shown in FIG. 1, for context-aware P2P communications. The architecture 200 may include a variety of structural entities and/or logic functions, such as a higher layer 202, discovery function 204, an association function 206, a data transceiving function 208, a channel management function 210, a general scan function 212, a synchronization function 214, a power control function 216, a measurement and reporting function 218, and a context management function 220. The functions 202-220 may be implemented by hardware and/or software in P2PNWs, such as the P2PNWs 102, 104, 106, and 108 depicted in FIG. 1 for example.

Still referring to FIG. 2, in accordance with illustrated embodiment, the higher layer 202 may be a layer above a physical (PHY) layer and medium access control layer in a protocol stack. As shown, the PHY layer and the MAC layer may be referred to collectively as a PHY/MAC layer 222. Thus, the higher layer 202 may refer to a service layer or an application layer in an infrastructure-less P2P wireless system. As further described below, the context management function 220 may manage context information across the PHY/MAC layer 222 and the higher layer 202 for context-aware P2P communications. The general scan function 212 may scan a beacon, preamble, a paging channel, a broadcasting channel, or the like for various information such as a context category, a context identifier (ID), context information, or the like. The general scan function may extract scanned information for the synchronization function 214, the peer discovery function 204, the channel management function 210, the power control function 216, the measurement and report function 218, and/or other functions.

Still referring to FIG. 2, in accordance with an example embodiment, the synchronization function 214 performs context-aware time synchronization with superframes, frames, and/or time slots. The context-aware time synchronization may refer to an initial or first synchronization or the context aware time synchronization may refer to a periodic time synchronization. In one embodiment, the synchronization function 214 may maintain frequency and/or phase synchronization. The discovery function 204 may discover peer(s) in proximity by using context category, context ID, and/or peer context information. The discovery function 204 may send messages with context category, context ID, and/or peer context information for to-be-discovered peers in proximity, as further described below. The association function 206 may request or respond to association messages, association updates, disassociation messages, or re-association messages by using context ID and/or peer context information. The channel management function 220 manages the radio resource or channel allocation among P2P networks based on context (e.g., services, applications). The channel management function 220 may further manage channel access within a P2P network based on peer context information. As further described below, the power control function may control transmit power control and manage interference, for example, based on context information and power control information. The data transceiving function 208 transmits and receives data in a context aware manner, for example, based on the quality of service (QoS) that is required by a service or application. The measurement and report function 218 may measure parameters associated with a channel, such as a QoS for example. The measurement and report function 218 may further send data reports associated with various functions, for instance the functions 204-216, to the higher layer 202, as further described below.

As illustrated in FIG. 2, parameters and context may be exchanged between the higher layer 202 and the functions 204-220. Reports from the measurement and report function 218 may be fed back to the higher layer 202. Certain logic functions in the PHY/MAC layer 222 may be triggered by the higher layer 202 and/or one or more other functions in the PHY/MAC layer 222. In an example embodiment, power control can be applied to, as least some, for instance all, transmissions. At least because the various functions within the architecture 200 may exchange context information with each other and with the higher layer 202, the example architecture 200 may also be referred to as a context-aware system architecture 200. Example interactions between the higher layer 202 and the various illustrated functions at the PHY/MAC layer 222, and example interactions between the illustrated logic functions with one another, are further described now.

With continuing reference to FIG. 2, in accordance with the illustrated embodiment, the higher layer 202, which may also be referred to as an upper layer 202, is the layer above the MAC layer in a layered structure for networking. For infrastructure-less P2P communications in proximity, in accordance with the illustrated embodiment, the higher layer 202 is a service or application layer. Triggers, which may include requests, and response messages may be exchanged between the higher layer 202 and the illustrated logic functions that reside at layers (e.g., PHY/MAC 222) are depicted in FIG. 2. The requests/responses, may enables direct interactions across layers for cross layer optimization. MAC primitives are described below that may be used to support messaging between the higher layer 202 and the illustrated functions, and such messaging may generally be referred to as cross layer interactions.

P2P communications may be initiated based on a desired service or application. Thus, P2P communications may be context driven. In the context-aware system architecture 200, the context is managed and exchanged across layers by the context information management function 220, which may be referred to as a cross-layer function, and the context is distributed to the illustrated functions at the PHY/MAC 222 as needed. For example, a first peer may be discovered by a second peer and associated with the second peer based on context. Table 1 shows examples of context information, presented by way of example and not presented by way of limitation, that may be used by various functions within the example context-aware architecture 200.

TABLE 1

| Example Context | Example Functions |
| --- | --- |
| Context Category (e.g., emergency, social networking, smart office, etc.) | General Scan, Discovery, Synchronization, Association, etc. |
| Context ID (e.g., Facebook, Netflix, GoToMeeting, etc.) | General Scan, Discovery, Synchronization, etc. |
| User/Device Info (e.g., user/device ID, user/device profile, etc.) | Discovery, Synchronization, Association, Power Control, etc. |

TABLE 1-continued

| Example Context | Example Functions |
| --- | --- |
| Service/Application Info (e.g., QoS requirements, required minimum peers for gaming, multi-hop for extending the service range, etc.) | Channel Management, Discovery, Association, etc. |
| Power Control Info (e.g., Power Category, Max./Min. Power, Power Control Interval, etc.) | General Scan, Power Control, Measurements, etc. |
| QoS Info (e.g., data rate, latency, priority, etc.) | Channel Management, Power Control, Data Transceiving, Measurements, etc. |
| Others (e.g., location, speed, channel, etc.) | General Scan, Channel Management, Discovery, Synchronization, Association, Power Control, Measurements, etc. |

In some cases, a peer can participate in multiple services or applications simultaneously. The context-aware architecture 200 enables the various functions to support multiple applications based on the context information that is exchanged. For example, different power control schemes may be used for different services or applications, and the power control schemes may be based on power control context as shown in Table 1.

The general scan function 212 may scan a beacon, preamble, a paging channel, a broadcasting channel, or the like for various information such as a context category, a context identifier (ID), context information, or the like. The general scan function may extract scanned information for the synchronization function 214, the peer discovery function 204, the channel management function 210, the power control function 216, the measurement and report function 218, and/or other functions. The general scan function 212 may be triggered or requested by the higher layer 202, the synchronization function 214, the discovery function 204, the channel management function 210, the power control function 216, or the measurement function 218. By way of example, in response to a request or trigger, the general scan function 212 may extract and provide detected results, such as available radio channels, signal strength, extracted context information, or the like for example, to the higher layer 202. The general scan function 212 may extract fields for the synchronization function 214. Such fields may include a synchronization bit pattern, a time stamp, a frame location, a slot size, or the like. The general scan function 212 may extract information for the discovery function 204. Such information may include an context ID, such as a service ID, an application ID, a user ID, a device ID, or the like. By way of further example, extracted information for the discovery function 204 may include other context information, such as a detected signal strength, used in discovery. The general scan function 212 may extract information for the channel management function 210, such as, for example, channel allocation information and channel usage information that is broadcast in proximity. The general scan function 212 may extract information for the power control function 216 such as, for example, a transmitting power level and related power control information in proximity. The general scan function 212 may detect signals in proximity used for measurements, and the general scan function 212 may provide such information to the measurement and report function 218.

The synchronization function 214 may perform context-aware time synchronization with superframes, frames, and/ or time slots. The context-aware time synchronization may refer to an initial or first synchronization, or the context aware time synchronization may refer to a periodic time synchronization. In one embodiment, the synchronization function 214 may maintain frequency and/or phase synchronization.

The synchronization function 214 may be triggered by, for example receive requests from, the higher layer 202, the general scan function 212, the discovery function 204, the association function 206, the data transceiving function 208, and the channel management function 210. The synchronization function 214 may respond to a trigger or request with various synchronization information or results. For example, the synchronization function 214 may send synchronization information to the higher layer 202 after recovering from a power saving mode, a sleep state, a system timing reset, or the like, which may be triggered by the higher layer 202. The synchronization function 214 may provide results (e.g., success or fail) to the general scan function 212 that indicate whether a synchronization was successful. For example, a successful synchronization may enable the general scan function 212 to extract fields that may be required by the discovery function 204, the channel management function 210, or the power control function 216. The discovery function 210 may receive results of a successful synchronization so that the discovery function 210 may to send or broadcast a "to be discovered" message via a common or a designated channel assigned by the channel management function 210. The association function 206 may receive results of a successful synchronization so that the association function 206 may proceed with an association, an association update, a re-association, or the like. The data transceiving function 208 may receive results of a successful synchronization so that the data transceiving function 208, for example, re-alignment with a time reference or boundary, correct a frequency and/or phase offset required by for data transceiving, or the like. The channel management function 210 may receive results of a successful synchronization so that the channel management function 210 may deliver appropriate channel requests and responses.

Still referring to FIG. 2, the discovery function 204 may discover peer(s) in proximity by using context category, context ID, and/or peer context information. The discovery function 204 may send messages with context category, context ID, and/or peer context information for to-be-discovered peers in proximity. The discovery function 204 may be triggered by, for example receive requests from, the higher layer 202 and the association function 206. The discovery function 204 may send responses to the higher layer 202 that include peer discovery results and related information. The discovery function 204 may send responses to the association function 206 that indicate peer candidates that have been discovered and related information for associating or re-associating peers.

In accordance with the illustrated embodiment, the association function 206 may be triggered by, for example receive requests from, the higher layer 202, discovery function 204, the synchronization function 214, and the data transceiving function 208. The association function 206 may send responses to the higher layer 202 that include peer association results and information related to peer association. The association function 206 may send a result that indicates a successful association to the discovery function 204 such that a discovery is stopped. Alternatively, the association function 206 may send a result that indicates a failed association to the discovery function 204 such that the association function 206 requests that the discovery function 204 find new peer candidates. The higher layer 202 may request that the association function 206 disassociate with a peer, for example, due to a channel condition or a QoS condition. By way of another example, the synchronization function 214 may request that the association function 206 disassociate with a peer, for example, due to a failed synchronization. By way of yet another example, the data transceiving function 208 may request that the association function 206 disassociate with a peer, for example, due to a failed data transfer. The association function 206 may respond to a disassociation request with a response that indicates that the disassociation was successful. Similarly, the higher layer 202 may request that the association function 206 perform a re-association, for example, after a peer returns from a power saving or sleep mode, or due to a channel condition. By way of example, the data transceiving function 208 may request that the association function 206 perform a re-association due to a QoS associated with received and/or transmitted data.

In accordance with the illustrated embodiment, the channel management function 210 may be triggered by, for example receive requests from, the higher layer 202, the discovery function 204, and the association function 206. The channel management function 210 may send responses to the higher layer 202 that include, for example, channel allocation information, channel usage information, channel measurements, QoS statuses, or the like. The channel management function 210 may send responses to the discovery function 204 that includes, for example, a channel allocation for broadcasting a message, such as a "to be discovered message" for example. The channel management function 210 may send responses to the association function 206 that includes, for example, a new channel allocation, usage information for association and/or re-association, a channel de-allocation, or the like.

The power control function 216 may perform transmitting power control and interference management during discovery, association, channel management, and data transceiving procedures. For example, the power control function 216 may estimate power for various transmissions. In accordance with the illustrated embodiment, the data transceiving function 208 may be triggered by, for example receive requests from, the higher layer 202. The data transceiving function 208 response with a success message, which may be an acknowledgement (ACK) message, or a failures message, which may be a negative acknowledgement (NACK) message. MAC primitives are described herein for supporting the interactions between the higher layer 202 and data transceiving function 208.

In accordance with the illustrated embodiment, the measurement and report function 218 conducts measurements requested by the higher layer 202, such as measurements association with a channel condition, a QoS, of the like. The measurement and report function 218 may also send measured results from other functions to the higher layer 202. The measurements and report function 218 may also be used to update context or generate new context that is shared among the functions and/or across layers by the context management function 220. The measurement and report function 218 may collect measurements and/or reports from one or more, up to all, of the illustrated functions 204-220 in the example architecture 200.

Referring also to Table 2 below, the measurement and report function 210 may be triggered by, for instance receive requests from, the higher layer 202. The higher layer 202 may request various measurements and reports that are associated with various functions, such as those presented by way of example in Table 2. Examples of measurements and reports provided by the logic functions within the architecture 200 are shown in Table 2.

TABLE 2

| Example Measurements/Reports | Example Functions |
| --- | --- |
| Channel condition (e.g., SINR, Received Signal Strength, Channel Quality Indicator, etc.) | Measurements, Power Control, etc. |
| QoS (i.e. data rate, error rate, etc.) | Data Transceiving |
| Channel status (e.g., allocation, usage, etc.) | Channel Management, etc. |
| Synchronization results (e.g., success, failure, time or frequency offset, etc.) | Synchronization |
| Discovery results (e.g., peer candidates, P2P network(s) detected in proximity, etc.) | Discovery |
| Association results (e.g., association log, association successful rate, etc.) | Association |
| Power Control Info (e.g., Max./Min. transmitting power, averaged transmitting power, power adjustment, etc.) | Power Control |

Figure 3:
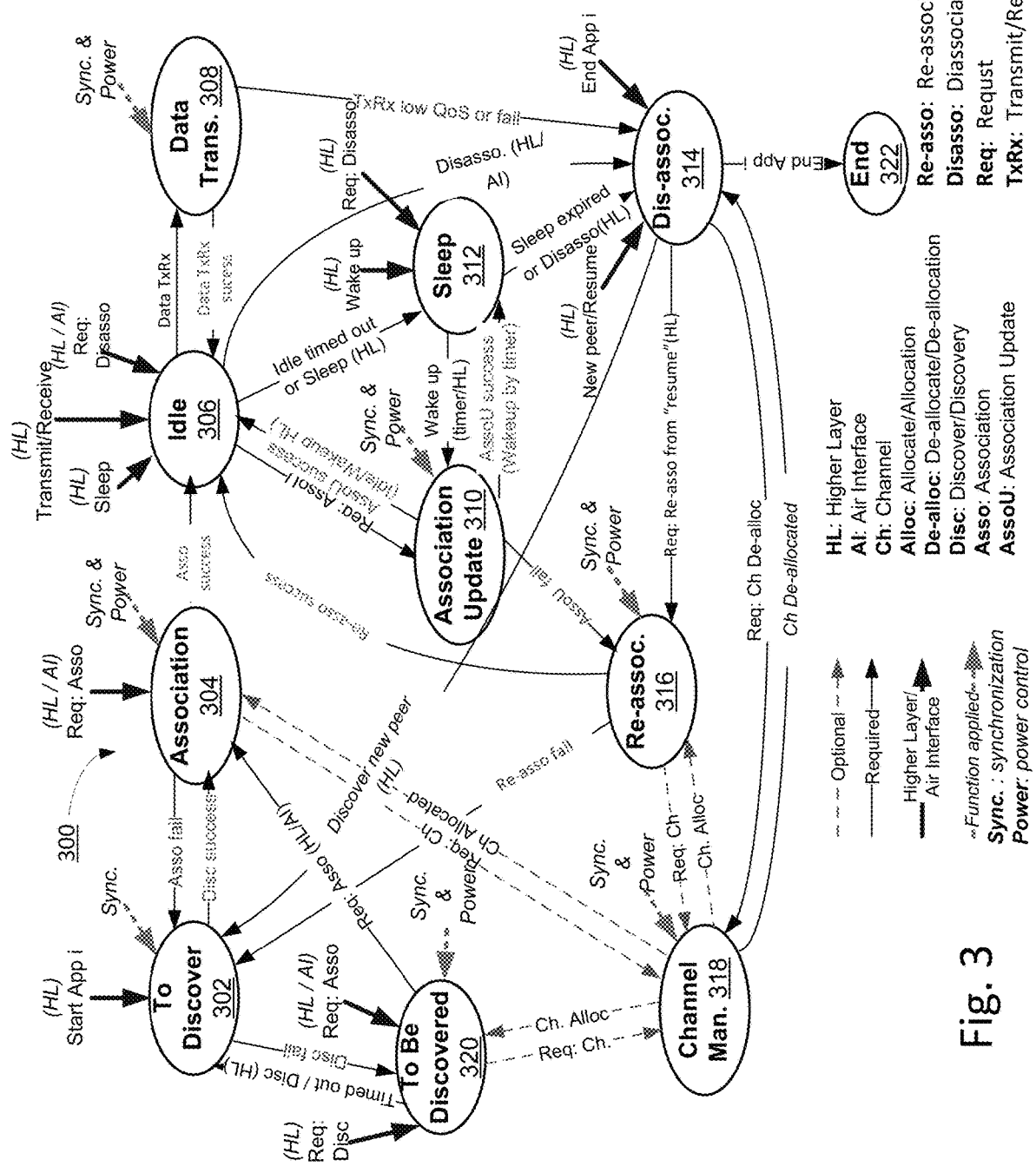
FIG. 3 depicts an exemplary State Machine of a P2P System.

FIG. 3 shows an example state diagram 300 for P2P communications that can be implemented by the architecture 200, such as one or more of the peers in the example system 100 for example. Referring to FIG. 3, an example P2P communication session may contain one or more operational states. As shown in FIG. 3, the operational states may include a "To Discover" state 302, an association state 304, an idle state 306, a data transceiving state 308, an association update state 310, a sleep state 312, a disassociation state 314, a re-association state 316, a channel management state 318, and a "To Be Discovered" state 320.

Referring also to FIG. 2, the higher layer 202 may send a trigger to the MAC/PHY layer 222 to start an application (depicted as application i in FIG. 3). Based on the trigger, a peer, for example a first peer, may enter the "To Discover" state 302. In the state 302, in accordance with the illustrated embodiment, the first peer scans for the other peers in proximity with the first peer. The peers may be scanned for Application i. The scan may include searching for beacons, paging, and/or searching for broadcasting channels. If a peer is discovered for Application i, the first peer may transition to the association state 304 to establish a connection or to link with the discovered peer. In some cases, if the first peer does not find a peer in proximity for Application i within a predefined scan time interval, the first peer may transition to the "To Be Discovered" state 320. In the "To Be Discovered State" 320, the first peer may request to be discovered by another peer. While the first peer is in the "To Be Discovered" state 320, the first peer may wait for an association request from a peer in proximity. By way of example, the first peer may request a designated channel to send the "To Be Discovered" message through the channel management state 318 for channel allocation. Alternatively, the first peer may send the "To Be Discovered" message on a known or predefined common, dedicated, or public channel, and thus may skip the channel management state 318 for channel allocation.

With continuing reference to FIG. 3, in accordance with the illustrated embodiment, the first peer may exit the "To Be Discovered" state 320, and transition to the association state 304 if an association request is received from the higher layer or an air interface associated with the first peer. An association request associated with an air interface of the first peer may be an association request from a peer in proximity. Alternatively, the first peer may exit the "To Be Discovered" state 320, and transition to the "To Discover" state 302, for example, if the first peer receives a "To Discover" request from the higher layer 202 of the "To Be Discovered" state 320 times out. As mentioned above, when the first peer is in the channel management state 318, the first peer may request a channel for transmitting a "To Be Discovered" message that indicates that the first peer wants to be discovered by another peer.

When the first peer is in the association state 304, the first peer may send an association request or an association response to a peer that has been discovered, for example a peer that has been discovered for Application i. The association messages may be sent or received via the air interface. The first peer may request a designated channel to send the "association" message through the channel management state 318 for channel allocation. Alternatively, the first peer may send the "association" message on a known or predefined common, dedicated, or public channel, and thus may skip the channel management state 318 for channel allocation. Similarly, by way of example, the first peer may request a radio link or channel for P2P data transceiving while in the association through the channel management state 318. Thus, the link or channel may be used as an intra-P2PNW channel while the first peer is in the data transceiving state 308. Alternatively, the first peer may use a predefined radio link or channel during the data transceiving state 308, and thus the first peer may skip the channel management state 318 for channel allocation. In accordance with the illustrated example, the first peer may exit the association state 304, and transitions to the idle state 306 after a successful association. During the idle state 306, the first peer may wait to transmit data or to receive a request. In an alternative example scenario, the first peer may exit the association state 304, and transition to the "To Discover" state 302, for example, to find a new peer in proximity for Application i. Such a transition may occur after an unsuccessful association.

As described above, during the channel management state 318, the first peer may request channel allocation for transmitting an association message and/or to access an intra-P2PNW channel that can be used when the first peer is in the data transceiving state 308. When the first peer is in the idle state 306, the first peer may wait for a data request after a successful association, association update, re-association, or data transmission. The first peer may exit the idle state 306, and transition to the data transceiving 308, for example state after receiving a data transmission or signal from the higher layer 202. The first peer may exit the idle state 306 and transitions periodically to the association update state 310, for example, to maintain an association with a current peer while data is not being transmitted or received. In some cases, the first peer may exit the idle state 306 and transition to the sleep state 312 for saving power as a result of receiving a sleep command from the higher layer 202. In other cases, the first peer may exit the idle state 306 and transition to the disassociation state 314 as a result of a Disassociation Request that is received from the higher layer or another peer via the air interface. The disassociation request may be based on a mobility associated with the first peer, a channel condition, or the like.

In accordance with the illustrated example, the first peer may enter the data transceiving state 308 from the idle state 306. When the first peer is in the data transceiving state 308, the first peer may transmit data or receive data from another peer via the air interface. When exiting the data transceiving state 308, the first peer may transition to the idle state 306, for example, after a successful data transmission or a successful data reception. Alternatively, the first peer may exit the data transceiving state 308 and transitions to the disassociation state 314, for example, because of low QoS or because of a data reception or transmission failure.

Referring now to the association update state 310, as shown, the first peer may enter the association update state 310 from the idle state 306 or the sleep state 312. The first peer may update a current association with a peer, via the air interface, using an association update request and/or response. The first peer may exit the association update state 310 and transition to the idle state 306 state after a successful "Association Update" has been performed. Alternatively, the first peer may exit the association update state 310 and transition to the sleep state 312 after a successful "Association Update" has been performed based on a timed wake up from the sleep state 312. Alternatively still, the first peer may exit the association update state 310 and transition to the re-association state 316 to establish a new link after an unsuccessful association update is performed with the current link.

Referring now in particular to the sleep state 312 depicted in the diagram 300, the first peer may enter the sleep state 312 from the idle state 306, for example, due to a predetermined time associated with the idle state 306 elapsing,), or due to a sleep command that is received from the higher layer 202. Thus, the first peer may periodically enter the association update state 310 as defined by a wake up timer, or the first peer may enter the association update state as a result of the higher layer's "wake up" command. Similarly, the first peer may transition to the disassociation state 314 after a predefined time interval elapses without any data transceiving activity, or as a result of a disassociation command that is received from the higher layer 202.

In accordance with the illustrated example, in the disassociation state 314, the first peer may make a channel deallocation request such that link resources are released via the channel management state 318. The first peer may enter the disassociation state 314 from the data transceiving state 308, for example, in response to a low QoS or in response to a failed data transmission or reception. By way of further example, the first peer may enter the disassociation state 314 from the idle state 306 in response to a disassociation request from the higher layer 202 or a peer via the air interface. By way of yet another example, the first peer may enter the disassociation state 314 from the sleep state 312 in response to a predetermined time associated with a sleep mode expiring or in response to receive a disassociation request from the higher layer 202. The first peer may exit the disassociation state 314, and transition to the re-association state 316 in response to a "Resume" (re-association) command received from the higher layer 202. Alternatively, the first peer may exit the disassociation state 314, and transition to the "to Discover" state 302 in response to "Discover New Peer" command received from the higher layer 202. Alternatively still, the first peer may exit the disassociation state 314, and transition to the End state in which the application i ends, in response to an "End Application i" command received from the higher layer 202.

Referring in particular to the re-association state 316, the first peer may perform re-association with a peer via the air interface. The first peer may enter the re-association state 316 from the association update state 310, for example, in response to a failure in updating a current link (the current association) between peers. The first peer may enter the re-association state 316 from the disassociation update state 314 in response to a "Resume" command received from the higher layer 202. Re-association requests may sent over designated channels in which the first peer requests via the channel management state 318. Alternatively, re-association messages may be sent over common or public channels, and thus the channel management state 318 (for channel allocation) may be skipped during re-association. The first peer may exit the re-association state 316 and transition to the idle state 306 after a successful re-association. In another example, the first peer may exit the re-association state and transition to the "To Discover" state 302 to find a new peer, for example, in response to an unsuccessful re-association with the current peer. During the ends state 322, in accordance with the illustrated example, the first peer exits Application i after disassociation in response to an "End Application i" command received from the higher layer 202.

Figure 4:
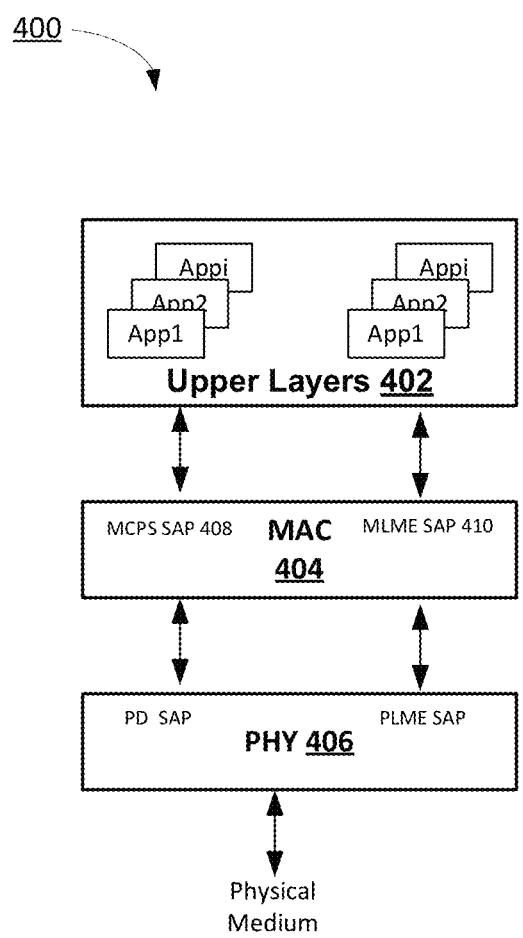
FIG. 4 depicts exemplary interfaces between a medium access control (MAC) layer and higher layers.

Referring now to FIG. 4, an example protocol stack 400 includes the upper layers 402 (which may also be referred to as the higher layer 202, without limitation), a MAC layer 404 that is below the upper layers 402 in the stack 400, and a PHY layer 406 that is below the MAC layer 404 in the stack 400. The higher layer 402 may include various applications, and thus may also be referred to as an application layer. As shown in FIG. 4, a MAC Layer Management Entity (MLME) Service Accessing Point (SAP) 408 and an MAC Common Part Sublayer (MCPS) SAP 410 interfaces between the MAC layer 404 and the upper layers 402, where the MLME SAP 408 is for management and the MCPS SAP 410 is for data as specified in IEEE 802.15.

To support multiple applications in the upper layers 402, several example context-aware, and in particular application-aware. MAC Primitives are described below. In accordance with various embodiments, example MAC MLME primitives are listed in Table 3 (below) for management messages that delivered through the MLME SAP 410 interface with the upper layer 402. Further, an example MAC MCPS primitive is listed in Table 4 (below) for data messages that delivered through the MCPS SAP 408 interface with the upper layer 402. The primitives presented in Table 3 and Table 4 are presented by way of example, and are not presented by way of limitation.

TABLE 3

| MLME Example Primitives | Type | Description |
| --- | --- | --- |
| MLME-CONTEXT-APPi | Request, Confirm | CONTEXT exchange for Application i<br>This may enables the context exchange with a higher layer for a specific application. |
| MLME-GENSCAN | Request, Confirm | GENeral SCAN initiated by higher layer<br>This may enable the higher layer to trigger a general purpose scan with related context information. For example, a general scan can be used to detect the useful peer information in proximity needed by multiple logic functions, such as, for example, peer discovery, context-aware synchronization, channel allocation detection, context-aware power detection etc., which may be particularly useful at the beginning of establishing an infrastructure-less P2P network. |
| MLME-START-APPi | Request, Confirm | START Application i<br>This may enable the higher layer to initiate a P2P network for a specific application. |
| MLME-SYNC-APPi | Request | SYNChronization for Application i<br>This may enable the higher layer to direct the Synchronization Function to synchronize with a specific application, which may be especially useful for supporting multiple applications simultaneously. |
| MLME-SYNC-LOSS-APPi | Indication | SYNChronization LOSS for Application i<br>This may enable the Synchronization Function to notice the higher layer the loss of synchronization for a specific application. |
| MLME-DISCOVERY-APPi | Request, Confirm, Indication, Response | DISCOVERY for Application i<br>This may enable the higher layer to assist peer discovery for a specific application. For example, some confirmation may be needed from the user for security and/or privacy concerns. |
| MLME-CHANNEL-APPi | Request, Confirm | CHANNEL management for Application i<br>This may enable the higher layer to trigger channel re-allocation due to channel conditions or QoS of the service for a specific application. |
| MLME-ASSOCIATE-APPi | Request, Confirm Indication, Response | ASSOCIATE for Application i<br>This may enable the higher layer to assist peer association for a specific application. For example, some confirmation may be needed from the user for security and/or privacy concerns. |
| MLME-ASSOCIATEUPDATE-APPi | Request, Confirm Indication, Response | ASSOCIATE UPDATE for Application i<br>This may enable the higher layer to trigger association update for a specific application. For example, update the associate due to context change, or QoS, etc. |
| MLME-DISASSOCIATE-APPi | Request, Confirm, Indication, Response | DISASSOCIATE for Application i<br>This may enable the higher layer to trigger disassociation for a specific application. For example, disassociation due to channel status, QoS, or service policy, etc. |

TABLE 3-continued

| MLME Example Primitives | Type | Description |
|---|---|---|
| MLME-REASSOCIATE-APPi | Request, Indication, Response, Confirm | RE-ASSOCIATE for Application i<br>This may enable the higher layer to trigger re-association for a specific application. For example, re-associate due to channel condition, QoS, or policy, etc. |
| MLME-TX-APPi | Request, Confirm | Enable TX (transmitting) for Application i<br>This may allow the higher layer to enable transmitting for a specific application. |
| MLME-RX-APPi | Request, Confirm | Enable RX (receiving) for Application i<br>This may allow the higher layer to enable receiving for a specific application. |
| MLME-POWERCONTROL-APPi | Request, Confirm | POWER CONTROL for Application i<br>This may enable the higher layer to trigger the context-aware power control for a specific application. |
| MLME-MEASURE-APPi | Request, Confirm | MEASUREment for Application i<br>This may enable the higher layer to trigger the measurement for a specific application, which may be used for cross-layer QoS management. |
| MLME-REPORT-APPi | Request, Confirm | REPORT from logic functions for Application i<br>This may enable the higher layer to trigger the report function for a specific application, which may be used for cross-layer QoS management. |
| MLME-SLEEP-APPi | Request, Confirm, Indication, Response | SLEEP mode for Application i<br>This may enable the higher layer to force lower layers into sleep mode. |
| MLME-WAKEDUP-APPi | Request, Confirm | WAKE UP from sleep mode for Application i<br>This may enable the higher layer to pull lower layers out of sleep mode. |

TABLE 4

| MCPS Primitives | Type | Description |
|---|---|---|
| MCPS-DATA-APPi | Request, Indication, Confirm | DATA transmission for Application i<br>This may enable the higher layer to trigger the Data Transceiving Function to transmit data for a specific application, which may be needed for supporting multi-application data transmitting and receiving. |

Figure 5:
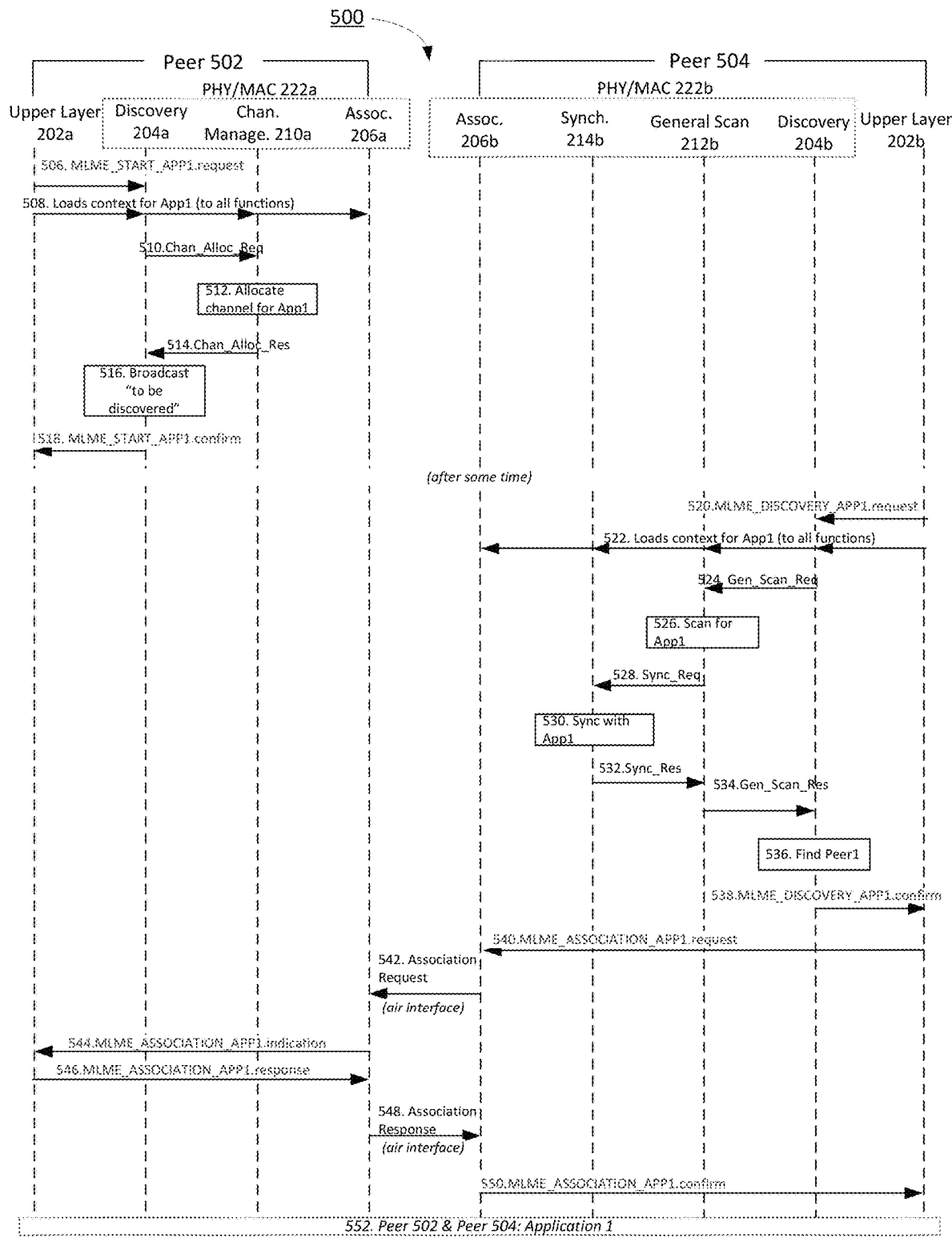
FIG. 5 illustrates an exemplary call for an P2P session initiation between two peers.

Referring generally to FIG. 2 and particularly to FIG. 5, an example system 500, which includes at least a portion of the architecture 200, initiates P2P communication in a context-aware manner in accordance with an example embodiment. The system 500 includes a plurality of peers, for example a first peer 502 and a second peer 504. It will be appreciated that the example system 500 is simplified to facilitate description of the disclosed subject matter and is not intended to limit the scope of this disclosure. Other devices, systems, and configurations may be used to implement the embodiments disclosed herein in addition to, or instead of, a system such as the system 500, and all such embodiments are contemplated as within the scope of the present disclosure.

Still referring to FIG. 5, in accordance with the illustrated embodiment, a P2P communication in proximity is established based on the a desired service or application, and thus P2P communication in proximity is based on a desired context. The procedure may contain the following steps for setting up a P2P communication in proximity. The above-listed context-aware IEEE 802.15.8 MAC Primitives are used in the example embodiment shown in FIG. 5 so that the peers can interface with a higher layer, such as the higher layer 202, which may also be referred to as the upper layer 202. As one example, the peer 502 and 504 may have the configuration illustrated in FIG. 10C (described more fully below) or a variation thereof. The peers 502 and 504 may further have the architecture 200 illustrated in FIG. 2. For example, as illustrated, the first peer 502 includes a first upper layer 202a and a first PHY/MAC layer 222a that includes a first discovery function 204a, a first channel management function 210a, and a first association function 206a. Further, as illustrated, the second peer 504 includes a second upper layer 202b and a second PHY/MAC layer 222b that includes a second discovery function 204b, a second association function 206b, a second synchronization function 214b, and a second general scan function 210b. It will be understood that the peers 502 and 504 may include other functions in addition to the functions that are illustrated, such as those functions that are described with reference to FIG. 2 for example, as desired.

At 506, in accordance with the illustrated embodiment, the first peer 502 wants to start a P2P session in proximity with an application depicted for purposes of example in FIG. 5 as Application 1. At 506, the first upper layer 202a sends the first peer 502 an MLME-START-APP1 request to trigger the first discovery function 204a. At 508, the first upper layer 202a downloads context related to Application) to at least some functions, for instance all functions, via the first context management function 210a. At 510, the first peer 502 makes a channel allocation request. In particular, at 510, the first discovery function 204a sends a request to the first channel management function 201 for a radio resource to be used for broadcasting or sending a "to be discovered" message in proximity. At 512, the first channel management function 210a finds the radio resource or channel in proximity for Application). At 514, in accordance with the illustrated example, the first channel management function 210a responds back to the first discovery function 204a with channel allocation information. At 516, the first discovery function 204a broadcasts or sends a "to be discovered"

message over the assigned channel, and waits for the response to the discovery request from a peer or peers in the proximity, such as the second peer 504 for example. At 518, the first discovery function 204a responds to the first upper Layer 202a with a MLME-START-APP1.confirm message.

Still referring to FIG. 5, at 520, which may after some time after the first upper layer 202 receives the confirmation message from 518, the second upper layer 202b of the second peer 504 sends a discovery trigger or request (e.g., MLME-DISCOVERY-APP1.request) to the second discovery function 204b, for example, because the second peer 504 may want to discover one or more peers for Application 1 in proximity. At 522, the second upper layer 202b downloads context related to Application1 to logic functions of the second peer 504 via the context management function 210 of the second peer 504. At 524, the second discovery function 204b sends a trigger or request to the second general scan function 210B for Application). At 526, in accordance with the illustrated embodiment, the second general scan function 210B scans for Application1, for example, by scanning Beacons, preambles, paging and/or broadcast messages for peer discovery with context information related to Application1, such as Context Category and/or Context ID for example. At 528, the second general scan function 210B sends a synchronization trigger or request to the second synchronization function 214b with the synchronization information that was detected. At 530, the second synchronization function 214b performs context-aware synchronization with context information related to Application1. At 532, the second synchronization function 214b sends the synchronization response to the second general scan function 210B. At 534, the second general scan function 210B responds to the scan request from the second discovery function 204b with the extracted information for discovery. At 536, the second discovery function 204 discovers the first peer 502 for Application1 using context information associated with Application1, such as Context Category, Context ID, peer information, or the like. At 538, the second discovery function 204b responds to the second upper layer 202b with a confirmation message (e.g., MLME-DISCOVERY-APP1.confirm), and thus exits the discovery state.

With continuing reference to FIG. 5, at 540, the second upper layer 202b sends a trigger or request to the second association function 206b with an MLME-ASSOCIATION-APP 1.request, for example, after validating the discovery confirmation from the second discovery function 204b. At 542, the second association function 206b sends an association request to the first peer 502, over the air. The association request includes related context-aware association information. The first association function 206a receives the request. At 544, the first association function 206a notifies the first upper layer 202a with an MLME-ASSOCIATION-APP1.indication and related context-aware association information. At 546, in accordance with the illustrated example, the first upper layer 202a responds to the first association function 206a with an MLME-ASSOCIATION-APP1.response, after validating the association of the first peer 502 and the second peer 504. At 548, the first association function 206a responds back to the second peer 504 via the air interface. The second association function 206b notifies the second upper layer 202b a confirmation message (MLME-ASSOCIATION-APP1.confirm). Thus, at 552, the first and second peers 502 and 504 may enter the P2P session with each other for Application1.

In some cases in which applications have small and infrequent data transmissions or receptions, referred to herein as data transceivings, there may be long time intervals during which a P2P system does not transceive any data. A "keep alive" application for social networking is an example application that may have small or infrequent data transceivings. In such cases, in accordance with an example embodiment, power can be saved and interference in proximity can be limited by allowing peer devices to enter a sleep mode in which at least some of the radio units and data processing units of the peer devices are turned off FIGS. 6 and 7 depict example association operations associated with idle and sleep states, as described above.

Figure 6:
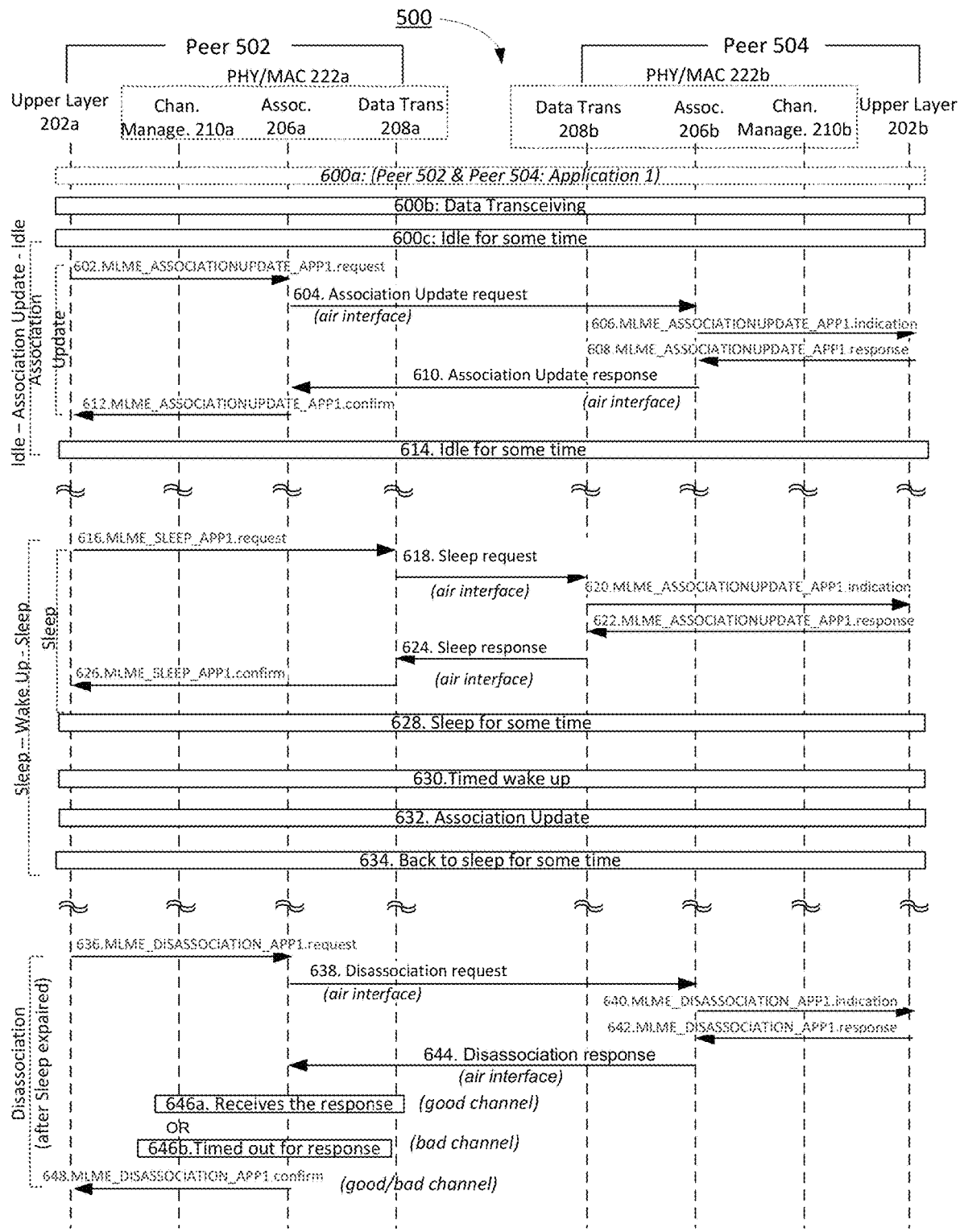
FIGS. 6 and 7 depict example association operations that include an idle and sleep mode for an example application.
Figure 7:
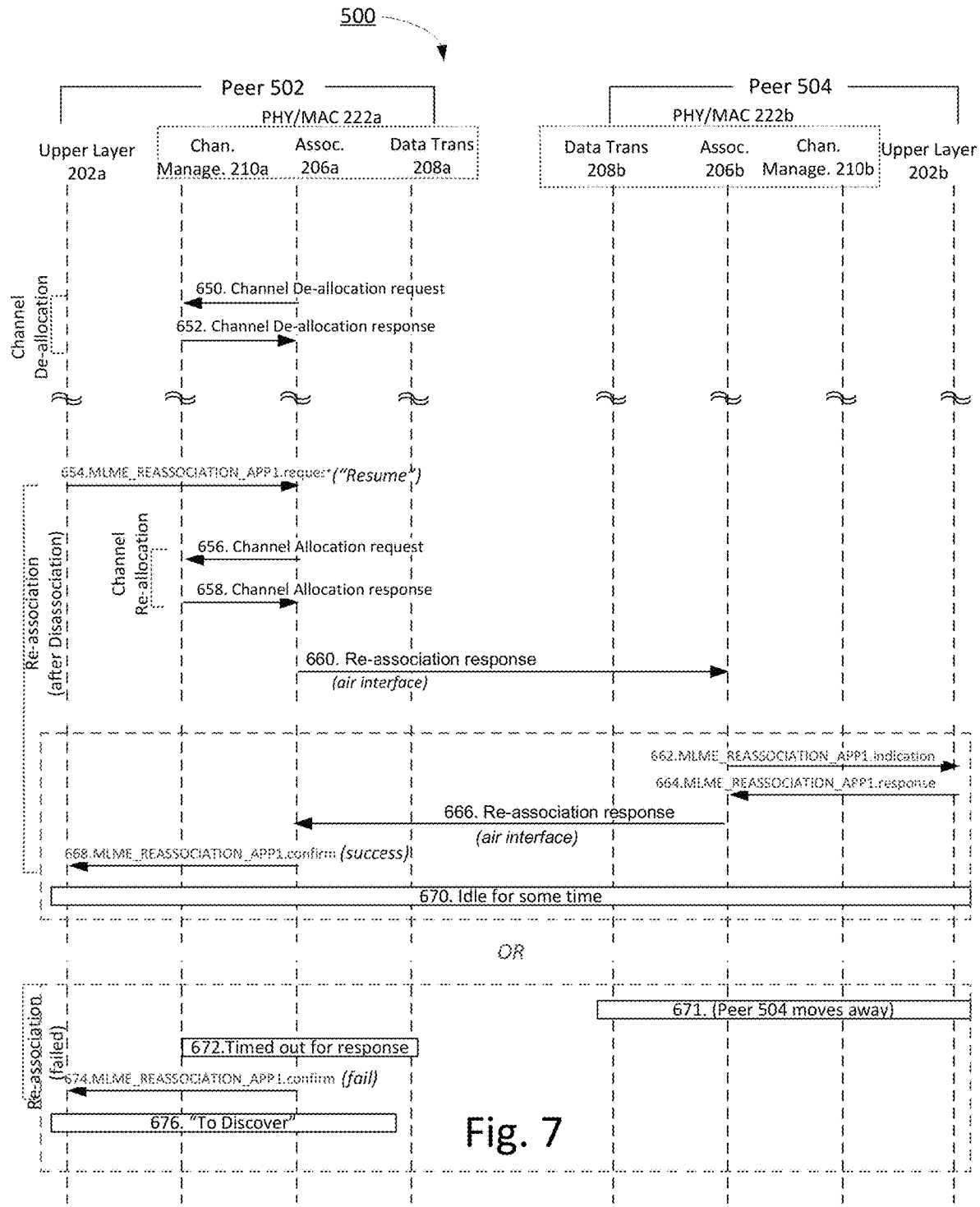

Referring to FIGS. 6 and 7, the example system 500 includes the first peer device 502, which further includes a first data transceiving function 208a. As illustrated in FIGS. 6 and 7, the second peer device 504 further includes a second data transceiving function 208b and a second context management function 210b. Referring in particular to FIG. 6, in accordance with the illustrated example, at 600a, the first and second peers 502 and 504 have established a P2P session with each other associated with an application, referred to for purposes of example as Application 1. Further, at 600c, the first and second peers 502 and 504 are in the idle state 306 after transmitting and receiving data between each other, at 600b. An association update may be initiated when a predefined Association Update timer expires or when an Association Update Request is received by the first association function 206a from the first upper layer 202a, at 602. At 604, in accordance with the illustrated example, the first peer 502 sends an Association Update request to the second peer 504 over the air (via an air interface). At 606, the second Association Function 206b of the second peer 504 indicates to the second Higher Layer 202b that an Association Update request has been received. At 608, the second Higher Layer 202b returns an Association Function Response to the second Association Function 206b, where the Association Function Response acknowledges the Association Update request. At 610, the second peer 504 sends an Association Update response to the first peer 502 via the Air Interface to acknowledge the Association Update. At 612, the Association Function 206a confirms to the first Higher 202a Layer that the Association Update is successful. At 614, the first and second peer 502 and 504 return to the idle state 306. It will be understood, as described above, that the peers 502 and 504 may repeat the cycle of transitioning between the idle state 306 and the association update state 310 without actively exchanging data.

Still referring to FIG. 6, at 616, the first higher layer 202a sends a sleep request to the data transceiver function 208a. Alternatively, the sleep state 312 may be initiated by a predefined Idle monitoring timer expiring. In accordance with the illustrated example, at 618, the first peer 502 sends a Sleep request to the second peer 504 via the Air Interface. At 620, the second higher layer 202b is notified, by the second data transceiver function 208b, that the Sleep request is received. At 622, the second higher layer returns a Sleep Response to acknowledge the sleep request. At 624, the second peer 504 sends a Sleep response to the first peer 502 via the Air Interface to acknowledge the Sleep request. At 626, in accordance with the illustrated example, the first Higher Layer 202a receives confirmation of the Sleep request. At 628, the first and second peers 502 and 504 set their sleep timers according to the request and enter into the sleep state 312. At 630, the sleep timers expire and the first and second peer 502 and 504 wake. At 632, the first and second peers 502 and 504 perform an Association Update as described above with respect to steps 602-612. At 624, the first and second peers 502 and 504 return to the sleep state 512. It will be understood, as described above, that the peers 502 and 504 may repeat the cycle of transitioning between the sleep state 312 and the association update state 310 without actively exchanging data.

With continuing reference to FIG. 6, in accordance with the illustrated example, at 636, the first upper layer 202a sends a Disassociation Request to the first association function 206a. Alternatively, a disassociation may be initiated by a predefined sleep monitoring timer when a sleep time expires. At 638, the first peer 502 sends a Disassociation request to the second peer 504 via the Air Interface. At 640, the association function 206b indicates to the second Higher Layer 202b that a Disassociation request is received. At 642, the second higher layer 202b returns a Disassociation Response to the second Association Function 202b, wherein the disassociation response acknowledges the Disassociation request. At 644, the second peer 504 sends a Disassociation response to the first peer 502 via the Air Interface to acknowledge the Disassociation. As shown, at 646a, the second peer's Disassociation response may be received at the first peer 502, thereby indicating a graceful Disassociation. Alternatively, as shown at 646b, the second peer's Disassociation response might not be received by the first peer 502, for example due channel problems, thereby resulting in a non-graceful Disassociation. Either way, at 648, the first Association Function 206a may confirm to the first Higher Layer 202a that the Disassociation is enforced with or without receiving the response from the second peer 504.

Referring now to FIG. 7, in accordance with the illustrated embodiment, at 650, the Association Function 206a sends a Channel De-allocation request to the first Channel Management Function 210a to release a resource (channel). At 652, the first Channel Management Function 210a releases the channel. The first and second peers 502 and 504 may stay disassociated for some time. At 654, a Re-association is initiated by the Higher Layer 202a. At 656, the first Association Function 206a sends a Channel Allocation request to the Channel Management Function 210a for the radio resource (channel). At 658, the first Channel Management Function 210a confirms the Channel Allocation. At 660, the first peer 502 sends a Re-association request to the second peer 504 via the Air Interface.

In one embodiment, at 662, the second association function 206b indicates to the second Higher Layer 202b that the Re-association request is received. Thus, at 664, the second higher layer 202b returns a Re-association Response to the second Association Function 206b that acknowledges the Re-association request. At 666, the second peer 504 sends a Re-association response to the first peer 502 via the Air Interface to acknowledge the Re-association. At 668, as shown, the first Association Function 206a confirms to the first Higher Layer 202a that the Re-association is successful. Thus, at 670, the first peer 502 and the second peer enter the idle state 306, and are ready for data transceiving.

In another example, at 671, the second peer 504 does not the re-association request from the first peer 502, or example, because the second peer moves away from the first peer 502, as shown at 671. Thus, at 672, the re-association may be timed out. At 674, in accordance with the illustrated example, the first Association Function 206a confirms to the first Higher Layer 202a that the Re-association has failed. Thus, at 676, the first peer may enter the "To Discover" state 302 to find a new peer in proximity.

Figure 8:
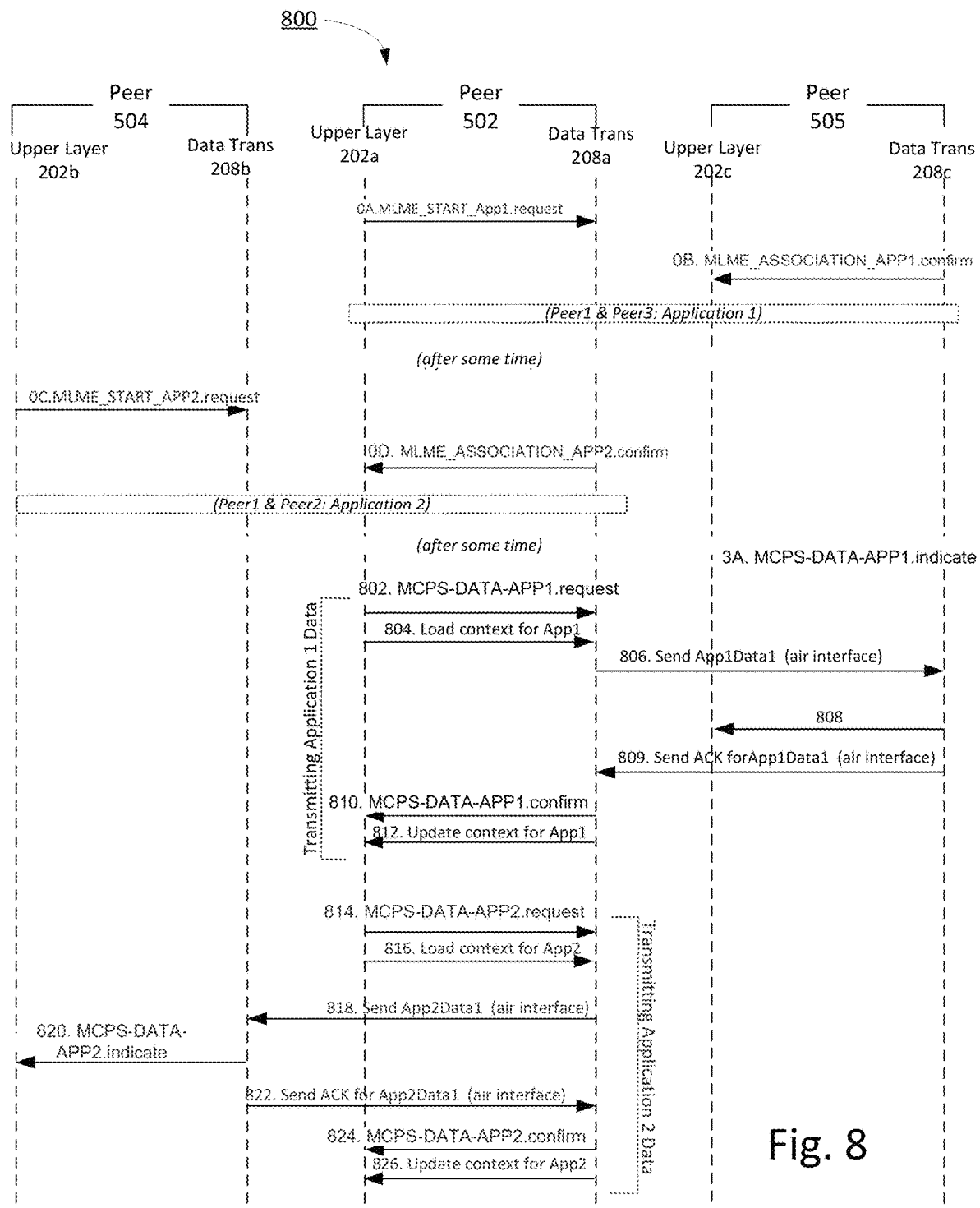
FIGS. 8 and 9 illustrate exemplary multi-application data transmitting and receiving.
Figure 9:
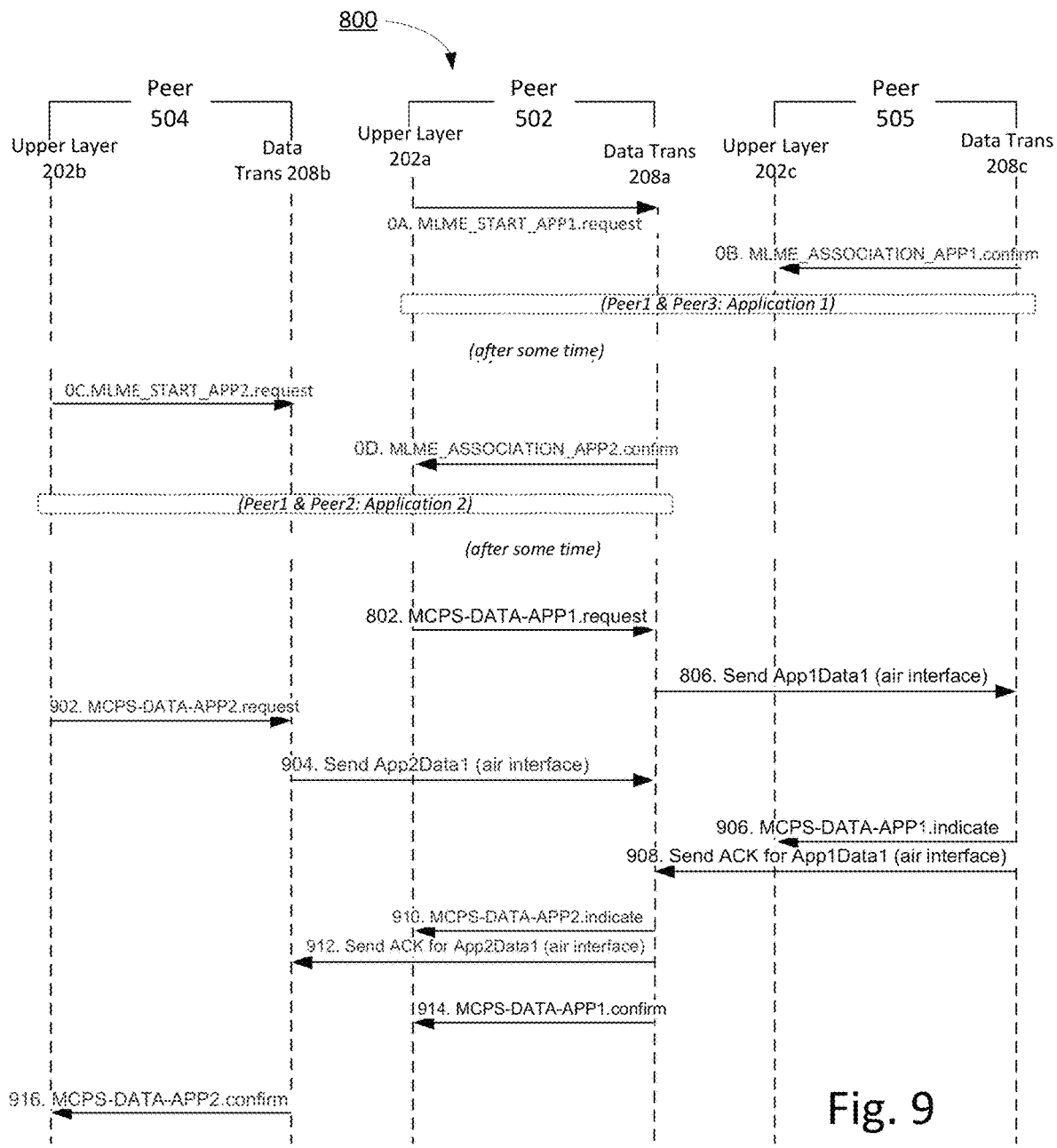

Referring now to FIGS. 8 and 9, an example system 800, which includes at least a portion of the architecture 200, includes a plurality of peers, for example the first peer 502, the second peer 504, and a third peer 505. It will be appreciated that the example system 800 is simplified to facilitate description of the disclosed subject matter and is not intended to limit the scope of this disclosure. Other devices, systems, and configurations may be used to implement the embodiments disclosed herein in addition to, or instead of, a system such as the system 800, and all such embodiments are contemplated as within the scope of the present disclosure. The third peer 505 may include the functions illustrated in FIG. 2, such as a third upper layer 202c and a third data transceiving function 208c for example.

Still referring to FIGS. 8 and 9, a peer may participate in multiple P2P services or applications simultaneously in accordance with an example embodiment. Thus, a peer may participate in multiple P2P sessions that overlap in time, as described below. Further, the multiple P2P sessions that overlap in time may use different applications. The context-aware architecture 200 may enable multi-application capability for P2P communications in proximity.

An example multi-application data transmission is illustration in FIG. 8. Referring in particular to FIG. 8, the first peer 502 and the second peer 505 may start a first P2P session with each other for a first application (Application 1), as described above with reference to FIG. 5. Further, the first peer 502 and the second peer 504 may start a second P2P session with each other for a second application (Application 2) that is different than Application 1. At 802, in accordance with the illustrated example, the first upper layer 202a sends a trigger or request that includes MCPS-DATA-APP1.request to the first data transceiving function 208a of the first peer 502. At 804, the first Upper Layer 202a downloads context information related to Application1 via the Context Management Function. At 806, the first Data Transceiving Function 208a sends data associated with Application1, to the third peer 505 over the air (via an air interface). At 808, as shown, the third peer 505 receives the data and notifies the third Upper Layer 202c with an MCPS-DATA-APP1.indication. At 809, the third peer 505 sends an acknowledgement (ACK) for the data associated with Application1 to the first peer 502 via air the interface between the first and third peers 502 and 505. At 810, the first peer 502 receives the ACK and notifies the first Upper Layer 202a with a message that includes the MCPS-DATA-APP1.confirm primitive. Thus, at 812, the first peer 502 may update the context and upload the updated Application1 context to the first Upper Layer 202a via the first Context Information Management function 210a.

Still referring to FIG. 8, in accordance with the illustrated example, at 814, the first Upper Layer 202a sends a trigger or a request (MCPS-DATA-APP2.request) to the Data Transceiving Function 208a. Further, at 816, the upper layer 202a downloads context information related to the second application (Application2) via the Context Management Function. At 818, the first Data Transceiving Function 208a sends data association with Application2 to the second peer 504 via the air interface. At 820, the second peer 504 receives the data and notifies the second Upper Layer 202b with MCPS-DATA-APP2.indication. At 822, the second peer 504 sends an ACK for the data associated with the Application2 to the first peer 502 via the air interface. At 824, in accordance with the illustrated example, the first peer 502 receives the ACK and notifies the first Upper Layer 202a with the MCPS-DATA-APP2.confirm message. At 826, the first peer 504 may update the context and upload the updated Application2 context to the first Upper Layer 202a via the first Context Information Management function 210a.

Referring now to FIG. 9, it will be understood that like reference numbers are repeated in various figures to indicate the same or similar features. In accordance with the illustrated example, at 902, the second Upper Layer 202b sends a data transmission request to the second Data Transceiving Function 208b. At 904, the second Data Transceiving Function 208b sends data associated with Application2 to the first peer 502 via the air interface. At 906, in accordance with the illustrated embodiment, the third peer 505 receives the Application1 Data from the first peer 502 and notifies the third Upper Layer 202c with an MCPS-DATA-APP1.indication. At 908, the third peer 505 sends an ACK, in response to the receiving the data association with Application), the first peer 502 via the air interface. At 910, the first peer 502 receives data associated with Application2 from the second peer 504 and notifies the first Upper Layer 202a with a MCPS-DATA-APP2.indication. At 912, the first peer 504 sends an ACK for the Application2 data to the second peer 504 via the air interface. At 914, in accordance with the illustrated example, the first peer 504 receives the ACK from the third peer 505 for the data associated with Application1 and notifies the Upper Layer 202a with MCPS-DATA-APP1.confirm. At 916, the second peer 504 receives the ACK from the first peer 502 and notifies the second Upper Layer 202b with MCPS-DATA-APP2.confirm.

Figure 10A:
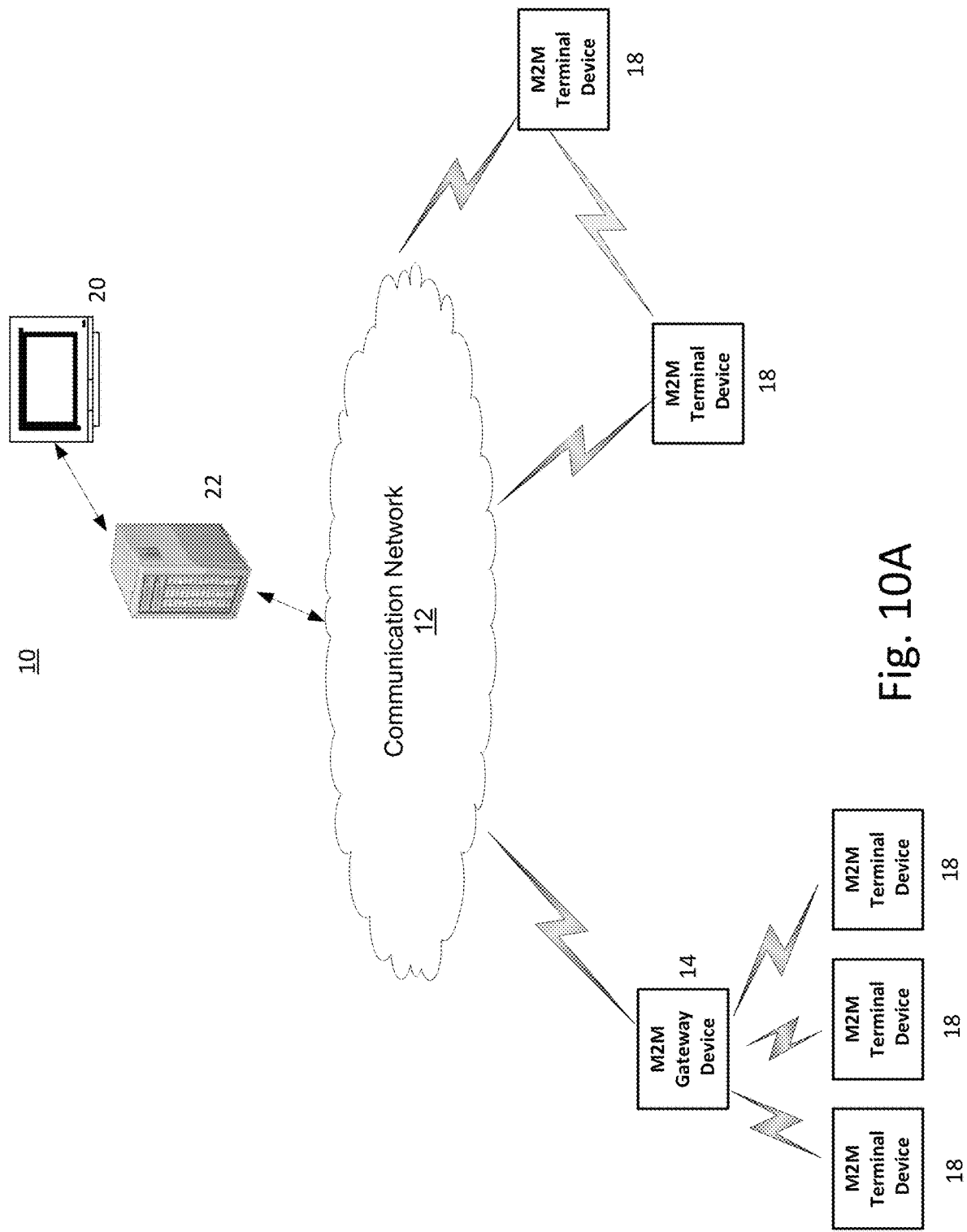
FIG. 10A is a system diagram of an example machine-to-machine (M2M) or Internet of Things (IoT) communication system in which one or more disclosed embodiments may be implemented.

FIG. 10A is a diagram of an example machine-to machine (M2M), Internet of Things (IoT), or Web of Things (WoT) communication system 10 in which one or more disclosed embodiments may be implemented. For example, the architecture and peers described with reference to FIGS. 2-9 may be implemented on various devices depicted in FIG. 10A, as described further below. Generally, M2M technologies provide building blocks for the IoT/WoT, and any M2M device, gateway or service platform may be a component of the IoT/WoT as well as an IoT/WoT service layer, etc.

As shown in FIG. 10A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 10A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. The gateway devices 14 or the terminal devices 18 may be configured as peer devices in a system that performs context-aware P2P communications in accordance with the embodiments described above. The gateway devices 14 and/or the terminal devices 18 may be configured as the peer devices described above, and thus each of the gateway devices 14 and the terminal devices 18 may include the architecture 200. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. The terminal devices 18 and the gateway devices 14 may communicate via various networks to exchange P2P messages, as described above. For example, peer-to-peer communications described above can occur directly between multiple terminal devices 18, directly between multiple gateway devices 14, or directly between terminal devices 18 and gateway devices 14.

Figure 10B:
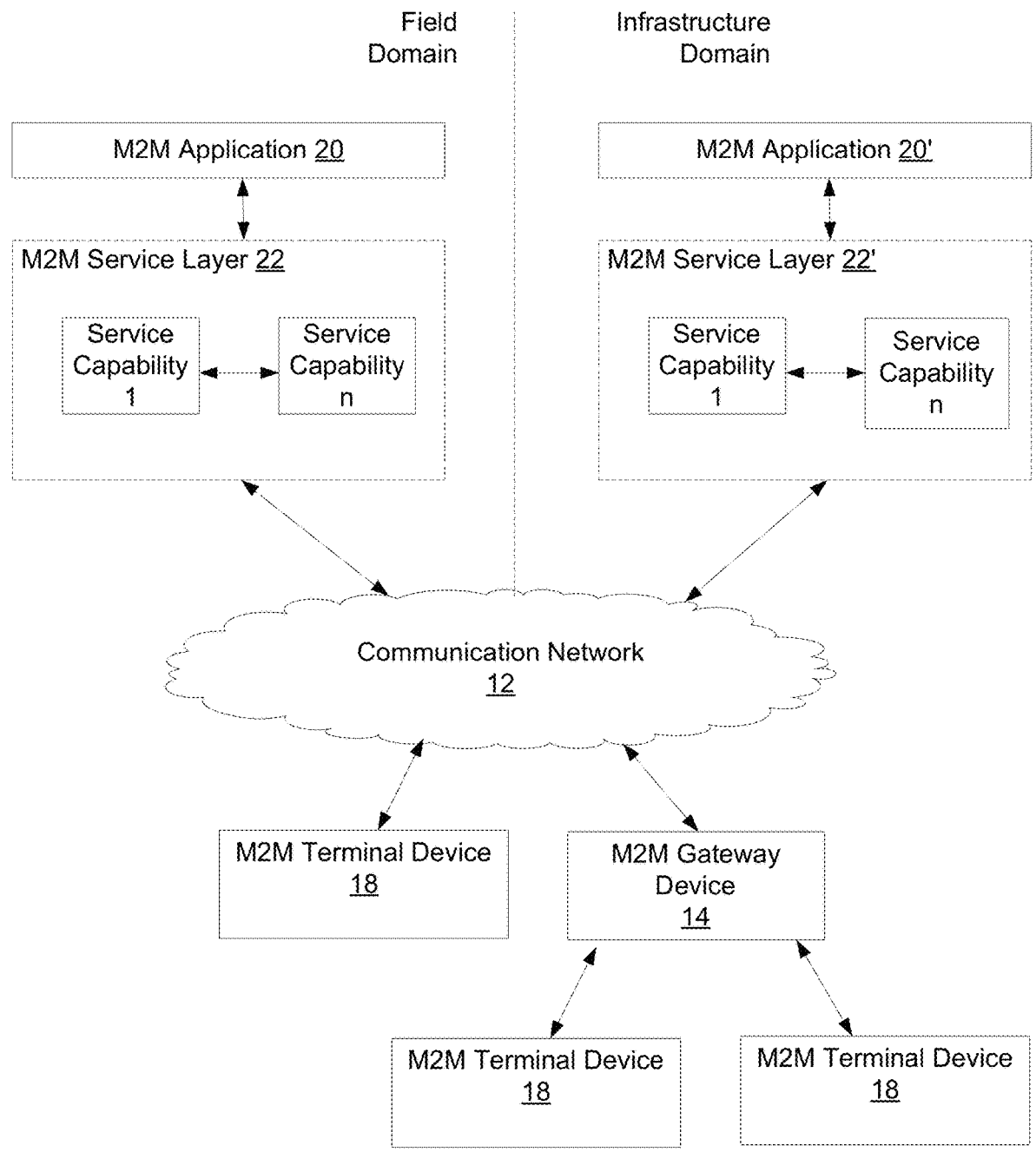
FIG. 10B is a system diagram of an example architecture that may be used within the M2M/IoT communications system illustrated in FIG. 10A.

Referring also to FIG. 10B, the illustrated M2M service layer 22 in the field domain provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18, and communication networks 12 as desired. The M2M service layer 22 may be implemented by one or more servers, computers, or the like. The M2M service 22 layer provides service capabilities that apply to the M2M terminal devices 18, the M2M gateway devices 14, and the M2M applications 20. The functions of the M2M service layer 22 may be implemented in a variety of ways, for example as a web server, in the cellular core network, in the cloud, etc.

Similar to the illustrated M2M service layer 22, an M2M service layer 22' resides in the infrastructure domain. The M2M service layer 22' provides services for an M2M application 20' and an underlying communication network 12' in the infrastructure domain. The M2M service layer 22' also provides services for the M2M gateway devices 14 and M2M terminal devices 18 in the field domain. It will be understood that the M2M service layer 22' may communicate with any number of M2M applications, M2M gateway devices, and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring still to FIG. 10B, the M2M service layers 22 and 22' can provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities can free the applications of the burden of implementing these functionalities, thus simplifying application development and reducing cost and time to market. The service layers 22 and 22' also may enable M2M applications 20 and 20' to communicate through various networks 12 and 12' in connection with the services that the service layers 22 and 22' provide.

The MAC/PHY layer functions of the present application may communicate with a service layer. As used herein, a service layer may refer to a software middleware layer that supports value-added service capabilities through a set of Application Programming Interfaces (APIs) and underlying networking interfaces. Both ETSI M2M and oneM2M use a service layer that may implement the MAC/PHY layer functions described herein. ETSI M2M's service layer is referred to as the Service Capability Layer (SCL). Embodiments described herein may be implemented as part of the SCL, wherein the messages may be based on various protocols such as, for example, MQTT or AMQP. The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (e.g., service capabilities). An instantiation of a set of one or more particular types of CSFs is referred to as a Common Services Entity (CSE) which can be hosted on different types of network nodes (e.g. infrastructure node, middle node, application-specific node). Further, context-aware P2P communications described herein can be implemented as part of an M2M network that uses a Service Oriented Architecture (SOA) and/or a resource-oriented architecture (ROA) to access. Further, the context managers of the present application can implemented as part of an M2M network that uses a Service Oriented Architecture (SOA) and/or a resource-oriented architecture (ROA) to access services such as the context manager of the present application.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Figure 10C:
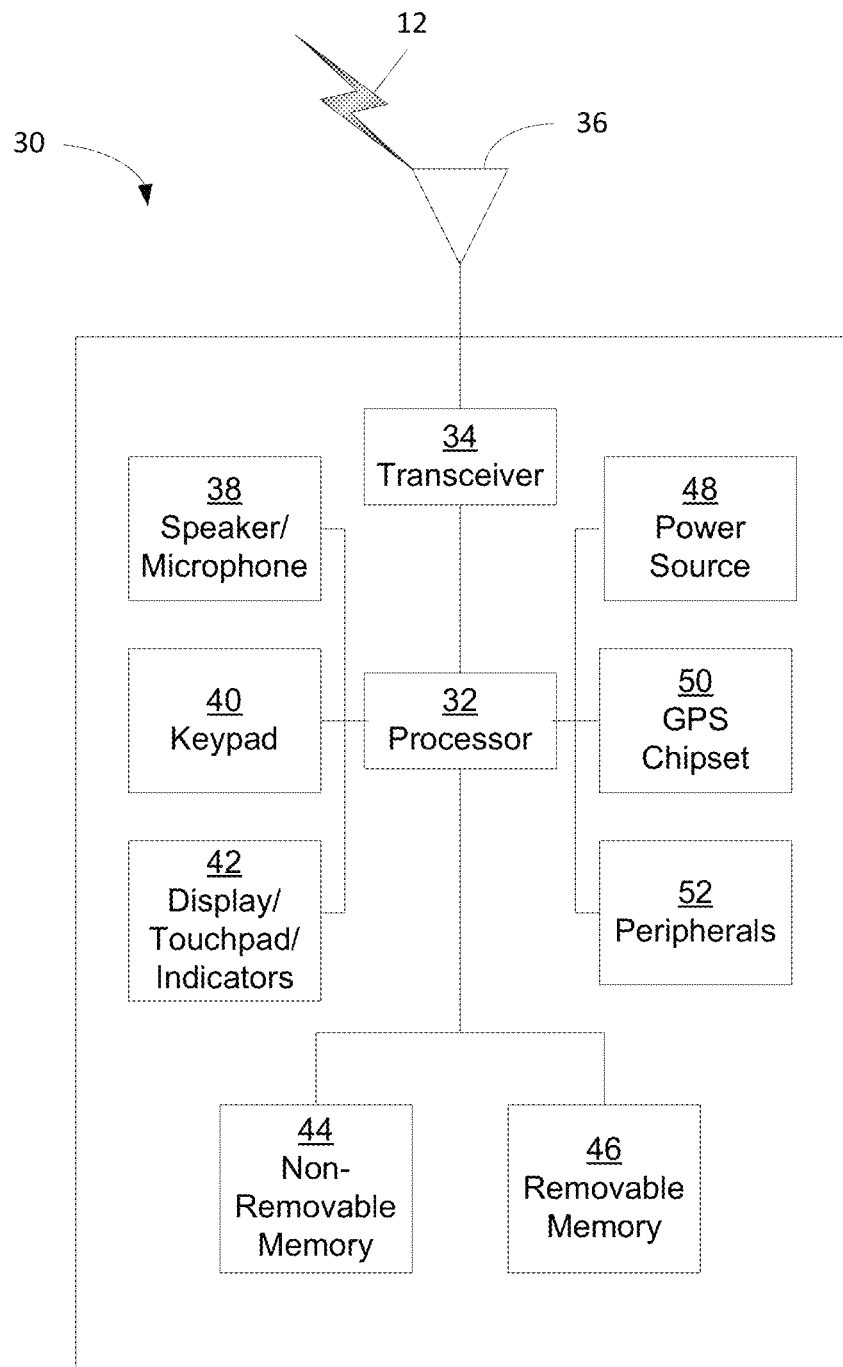
FIG. 10C is a system diagram of an example M2M/IoT terminal or gateway device that may be used within the communications system illustrated in FIG. 10A.

FIG. 10C is a system diagram of an example M2M device 30, such as an M2M terminal device 18 or an M2M gateway device 14 for example. The M2M device 30 may be configured as a peer for performing P2P communication, for instance context-aware P2P communication, in accordance with the embodiments described above. As shown in FIG. 10C, the M2M device 30 may include a processor 32, a transceiver 34, a transmit/receive element 36, a speaker/microphone 38, a keypad 40, a display/touchpad/indicators 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. The display/touchpad/indicators 42 may be generally referred to as a user interface in accordance with an example embodiment. The user interface, which also may be referred to as a context management interface, may allow users to monitor, manage, and/or configure context management on a peer device, such as a gateway or other network node for example. For example, the user interface may enable a user to configure or trigger context information exchange and management between different peers or between different layers. Thus, various context parameters (e.g., context values, context IDs, number of remaining responses, etc.) may be displayed by the display/touchpad/indicators 42.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 10C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 10C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store and access context information, as described above, from the non-removable memory 44 and/or the removable memory 46 to determine whether there is context information that satisfies a context information request. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10D:
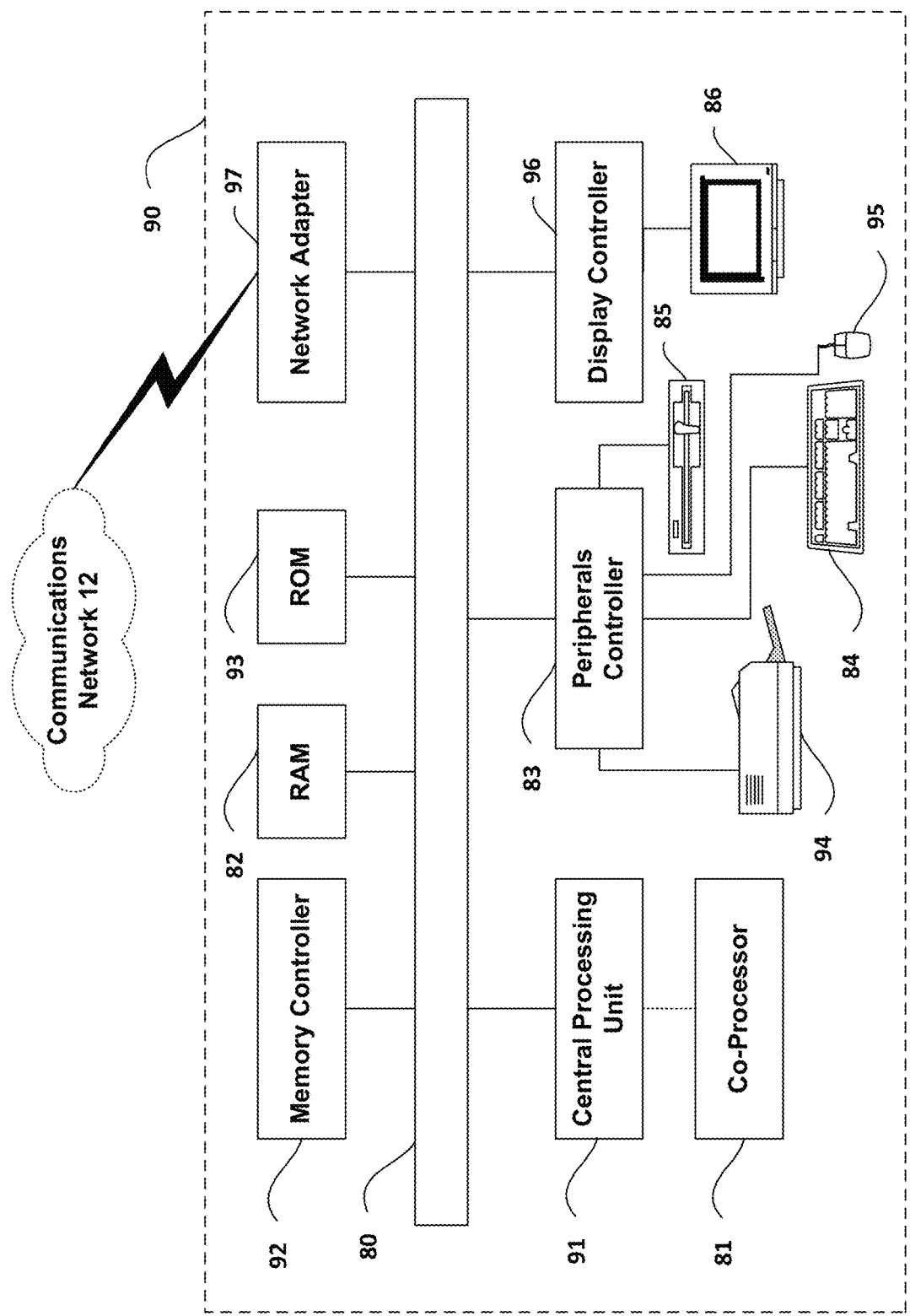
FIG. 10D is a block diagram of an example computing system in which aspects of the communication system of FIG. 10A may be embodied.

FIG. 10D is a block diagram of an exemplary computing system 90 on which, for example, the M2M service platform 22 of FIGS. 10A and 10B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 10A and 10B.

It is understood that any or all of the systems, methods and processes described herein may be embodied in the form of computer executable instructions (i.e., program code) stored on a computer-readable storage medium with instructions, when executed by a machine, such as a computer, server, peer, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims. This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. In a system comprising a plurality of peer devices in proximity with each other, a method comprising:
   triggering, by an upper layer of a first peer device of the plurality of peer devices, a first peer-to-peer (P2P) session, the first P2P session using a first application;
   downloading, by the upper layer of the first peer device, context information related to the first application;
   sending, by the first peer device to a second peer device, a discovery message for the first application;
   sending, by the first peer device to the second peer device, an association message for the first application;
   triggering, by at least one of the upper layer of the first peer device or a third peer device of the plurality of peer devices, a second peer-to-peer (P2P) session using a second application, wherein the second application is different from the first application, and wherein the second P2P session is running at the same time as the first P2P session;
   downloading, by at least one of the upper layer of the first peer device or the third peer device, context information related to the second application;
   sending, by at least one of the upper layer of the first peer device or the third peer device, a discovery message for the second application;
   sending, by at least one of the upper layer of the first peer device or the third peer device, an association message for the second application; and
   sending, by the first peer device, data associated with at least one of the first application or the second application.

2. The method as recited in claim 1, wherein the upper layer is above a physical and medium access control layer (PHY/MAC) layer, the upper layer being one of a service layer or an application layer.

3. The method as recited in claim 2, wherein the PHY/MAC layer comprises a discovery function, an association function, a data transceiving function, a general scan function, a synchronization function, a power control function, and a management and reporting function.

4. The method as recited in claim 1, wherein sending the discovery message comprises sending a discovery message for at least the first application or the second application on at least a common channel or a dedicated channel in proximity.

5. The method as recited in claim 1, wherein sending the association message comprises sending an association message for at least the first application or the second application on at least a common channel or a dedicated channel in proximity.

6. The method as recited in claim 1, wherein the context information is associated with at least one of a discovery function, an association function, a data transceiving function, a channel management function, a general scan function, a synchronization function, a power control function, and a management and reporting function.

7. The method as recited in claim 1, wherein the context information comprises quality of service information related to at least the first application or the second application.

8. The method as recited in claim 7, wherein the context associated with the first application is used for the first P2P session and the context associated with the second application is used for the second P2P session that is different than the first P2P session.

9. The method as recited in claim 1, the method further comprising:
   determining, based on at least one of a higher layer direction, a channel quality measurement, or an expiration of a communication state, dis-association information for at least the first P2P session or the second P2P session; and
   sending, by the first peer device or the third peer device, a dis-association message for at least the first P2P session or the second P2P session.

10. A first peer device of a plurality of peer devices in proximity, the first peer device comprising a processor and a memory, the memory containing computer-executable instructions that when executed by the processor, cause the first peer device to perform operations comprising:
    triggering, by an upper layer of the first peer device, a first peer-to-peer (P2P) session, the first P2P session using a first application; and
    downloading, by the upper layer of the first peer device, context information related to the first application;
    sending, by the first peer device to a second peer device, a discovery message for the first application;
    sending, by the first peer device to the second peer device, an association message for the first application;
    triggering, by at least one of the upper layer of the first peer device or a third peer device of the plurality of peer devices, a second peer-to-peer (P2P) session using a second application, wherein the second application is different from the first application, and wherein the second P2P session is running at the same time as the first P2P session;
    downloading, by at least one of the upper layer of the first peer device or the third peer device, context information related to the second application;
    sending, by at least one of the upper layer of the first peer device or the third peer device, a discovery message for the second application;
    sending, by at least one of the upper layer of the first peer device or the third peer device, an association message for the second application; and
    sending, by the first peer device, data associated with at least one of the first application or the second application.

11. The first peer device as recited in claim 10, wherein the upper layer is above a physical and medium access control layer (PHY/MAC) layer, the upper layer being one of a service layer or an application layer.

12. The first peer device as recited in claim 11, wherein the PHY/MAC layer comprises a discovery function, an association function, a data transceiving function, a general scan function, a synchronization function, and a power control function.

13. The first peer device as recited in claim 10, wherein sending the discovery message comprises sending a discovery message for at least the first application or the second application on at least a common channel or a dedicated channel in proximity.

14. The first peer device as recited in claim 10, wherein sending the association message comprises sending an association message for at least the first application or the second application on at least a common channel or a dedicated channel in proximity.

15. The first peer device as recited in claim 10, wherein the context information is associated with at least one of a discovery function, an association function, a data transceiving function, a channel management function, a general scan function, a synchronization function, a power control function, and a management and reporting function.

16. The first peer device as recited in claim 10, wherein the context information comprises quality of service information related to at least the first application or the second application.

17. The first peer device as recited in claim 16, wherein the context associated with the first application is used for the first P2P session and the context associated with the second application is used for the second P2P session that is different than the first P2P session.

18. The first peer device as recited in claim 10, wherein the computer-executable instructions, when executed by the processor, further cause the first peer device to perform operations comprising:

determining, based on at least one of a higher layer direction, a channel quality measurement, or an expiration of a communication state, dis-association information for at least the first P2P session or the second P2P session; and sending, by the first peer device or the third peer device, a dis-association message for at least the first P2P session or the second P2P session.

* * * * *